United States Patent
Jain et al.

(10) Patent No.: US 11,985,567 B2
(45) Date of Patent: May 14, 2024

(54) METHODS AND SYSTEMS FOR ENHANCEMENT OF POSITIONING RELATED PROTOCOLS

(71) Applicant: QUALCOMM Incorporated, San Diego, CA (US)

(72) Inventors: Amit Jain, San Diego, CA (US); Stephen William Edge, Escondido, CA (US); Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/563,736

(22) Filed: Sep. 6, 2019

(65) Prior Publication Data

US 2020/0084569 A1 Mar. 12, 2020

Related U.S. Application Data

(60) Provisional application No. 62/730,503, filed on Sep. 12, 2018.

(51) Int. Cl.
*H04W 4/02* (2018.01)
*H04W 80/06* (2009.01)
*H04W 80/08* (2009.01)

(52) U.S. Cl.
CPC .............. *H04W 4/02* (2013.01); *H04W 80/06* (2013.01); *H04W 80/08* (2013.01)

(58) Field of Classification Search
CPC ........ H04W 80/06; H04W 4/02; H04W 80/08
See application file for complete search history.

(56) References Cited

U.S. PATENT DOCUMENTS 9,094,810 B2  7/2015 Edge
9,386,406 B2 * 7/2016 Burroughs .............. H04W 4/02
(Continued)

FOREIGN PATENT DOCUMENTS

CN      1859798 A  * 11/2006
CN    101883427 A    11/2010
(Continued)

OTHER PUBLICATIONS

3rd Generation Partnership Project; Technical Specification Group Core Network and Terminals; Location Services (LCS); LCS Application Protocol (LCS-AP) between the Mobile Management Entity (MME) and Evolved Serving Mobile Location Centre (E-SMLC); SLsinterface (Release 15),3GPP Standard; Technical Specification; 3GPP TS 29.171, 3rd Generation Partnership Project (3GPP), Mobile Competence Centre; 650, Route Des Lucioles; F-06921 Sophia-Antipolis Cedex; France, vol. CTWG4, No. V15.0.0, Jun. 18, 2018, pp. 1-63.

(Continued)

*Primary Examiner* — Charles T Shedrick
(74) *Attorney, Agent, or Firm* — Weaver Austin Villenueve & Sampson LLP

(57) ABSTRACT

Methods and techniques are described for enhancing positioning related protocols in order to indicate when one location session is different from another location session. One or more messages provided in a location session by a location server to a user equipment (UE) may include a session indication, such as a session identifier (ID), where a different session ID is provided for each location session. The session indication may be a new session indicator provided in an initial message in a location session or an end session indicator provided in a final message in a location session. An extra message may be sent by the location server indicating that the location session has ended. A correlation (Continued)

ID provided by a network entity to the location server may be included in messages as the session indication, e.g., where a different correlation ID is provided for each location session.

28 Claims, 11 Drawing Sheets

(56) References Cited

U.S. PATENT DOCUMENTS

| | | | | |
|---|---|---|---|---|
| 9,439,163 | B2 * | 9/2016 | Ward | H04W 64/00 |
| 9,706,408 | B2 | 7/2017 | Hawkes et al. | |
| 2005/0250516 | A1 * | 11/2005 | Shim | H04W 8/18 |
| | | | | 455/456.6 |
| 2006/0258371 | A1 * | 11/2006 | Krishnamurthi | H04W 64/00 |
| | | | | 455/433 |
| 2007/0037586 | A1 * | 2/2007 | Kim | H04W 64/00 |
| | | | | 455/456.1 |
| 2008/0014962 | A1 * | 1/2008 | Shim | H04W 12/02 |
| | | | | 455/456.1 |
| 2008/0045237 | A1 * | 2/2008 | Yan | H04W 8/08 |
| | | | | 455/456.1 |
| 2009/0181698 | A1 * | 7/2009 | Farmer | H04W 4/20 |
| | | | | 455/456.3 |
| 2010/0035634 | A1 * | 2/2010 | Shim | H04W 4/029 |
| | | | | 455/456.1 |
| 2011/0143771 | A1 * | 6/2011 | Edge | H04L 67/52 |
| | | | | 455/456.1 |
| 2014/0073356 | A1 * | 3/2014 | Siomina | H04W 4/029 |
| | | | | 455/456.2 |
| 2014/0101236 | A1 * | 4/2014 | Dietrich | H04L 67/148 |
| | | | | 709/203 |
| 2019/0357011 | A1 | 11/2019 | Edge et al. | |

FOREIGN PATENT DOCUMENTS

| | | | | |
|---|---|---|---|---|
| CN | 103765930 A | * | 4/2014 | .......... H04L 63/107 |
| CN | 104076326 A | * | 10/2014 | .......... G01S 5/0018 |
| CN | 104737585 B | * | 9/2018 | ........ H04W 36/0055 |
| CN | 113301509 A | * | 8/2021 | ............. H04W 4/06 |
| TW | 201831011 A | | 8/2018 | |
| WO | WO-2007064147 A1 | * | 6/2007 | .......... H04L 63/107 |
| WO | WO-2011128503 A1 | * | 10/2011 | ............. G01S 19/05 |

OTHER PUBLICATIONS

Taiwan Search Report—TW108133009—TIPO—dated Sep. 13, 2022.
International Search Report and Written Opinion—PCT/US2019/050215—ISA/EPO—Nov. 26, 2019.
NTT Docomo et al: "Clarification on LPP and LPPa Transport and Routing", 3GPP Draft; R3-093153_LPP_LPPA Routing and Transport, 3rd Generation Partnership Project (3GPP), Mobile Competence Centre; 650, Route Des Lucioles; F-06921 Sophia-Antipolis Cedex; France, No. Jeju; Nov. 9, 2009, Nov. 9, 2009, XP050392608, 10 pages, [retrieved on Nov. 19, 2009] sections 1-5 figures 1-5.
3GPP TS 29.171: "3rd Generation Partnership Project, Technical Specification Group Core Network and Terminals Location Services (LCS), LCS Application Protocol (LCS-AP) between the MME and E-SMLC, SLS Interface (Release 9)", 3rd Generation Partnership Project, Mobile Competence Centre, 650, Route Des Lucioles, F-06921 Sophia- Antipolis Cedex, France, No. V0.3.0, Oct. 24, 2009, XP050400391, pp. 1-33, sec. 6.2.1, 6.2.2; 6.3, 7.3.1—7.3.4, 7.4.28, fig. 4.1-1.
Huawei: "Clarification on the Usage of Session ID", 3GPP TSG-RAN WG2 Meeting #68, R2-096512, 3rd Generation Partnership Project, Mobile Competence Centre, 650, Route Des Lucioles, F-06921 Sophia-Antipolis Cedex, France, No. Jeju, 20091109, Nov. 9, 2009, 5 Pages, XP050391099.
Qualcomm Incorporated: "Format of Correlation ID for Location Services in 5GS", 3GPP TSG CT4 Meeting #83, C4-182151, Montreal, CANADA, Feb. 26-Mar. 2, 2018, 1 Pages.

* cited by examiner

METHODS AND SYSTEMS FOR ENHANCEMENT OF POSITIONING RELATED PROTOCOLS

CROSS-REFERENCE TO RELATED APPLICATIONS

This application claims the benefit of U.S. Provisional Application No. 62/730,503, entitled "METHODS AND SYSTEMS FOR ENHANCEMENT OF POSITIONING PROTOCOLS," filed Sep. 12, 2018, which is assigned to the assignee hereof and which is expressly incorporated herein by reference in its entirety.

BACKGROUND

Field

The present disclosure relates generally to communication, and more specifically to techniques for supporting location services for user equipments (UEs).

Relevant Background

It is often desirable to know the location of a mobile station such as a cellular phone. For example, a location services (LCS) client may desire to know the location of a mobile station in the case of an emergency services call or to provide some service to the user of the mobile station such as navigation assistance or direction finding. The terms "location", "location estimate", "position", "position estimate" and "position fix" are synonymous and are used interchangeably herein.

During a location session, a location server (LS) and a mobile station (MS), sometimes referred to as a user equipment (UE), may exchange messages defined according to a positioning protocol in order to coordinate the determination of an estimated location. One positioning protocol is the LTE Positioning Protocol (LPP) defined by 3GPP in 3GPP Technical Specification (TS) 36.355. An LPP positioning session may be used by the LS and UE to obtain location related measurements or a location estimate or to transfer assistance data. An LPP positioning session may comprise one or more positioning transactions, each involving the exchange of one or more LPP messages between the LS and the UE. Each LPP message may contain information specific to one or more positioning methods and/or information common to all positioning methods. For an LPP positioning session initiated by an LS, the LS will typically be aware of the start and end of the LPP positioning session. However, the UE may not always be aware of the start and/or the end of an LPP positioning session, which may cause ambiguity for the UE in distinguishing one LPP positioning session from another or knowing when to cease supporting an LPP positioning session. Removing such ambiguity may be desirable, e.g. to avoid unforeseen consequences such as reservation of UE storage or provision of UE measurements for an LPP session that has ended.

SUMMARY

Methods and techniques are described for enhancing positioning related protocols (e.g. LPP or a NAS transport protocol used to transport LPP messages) in order to indicate when one location session is different from another location session. One or more messages provided in a location session by a location server to a user equipment (UE) may include a session indication, such as a session identifier (ID), where a different session ID is provided for each location session. The session indication may be a new session indicator provided in an initial message in a location session or an end session indicator provided in a final message in a location session. An extra message may be sent by the location server indicating that the location session has ended. A correlation ID provided by a network entity to the location server may be included in messages as the session indication, e.g., where a different correlation ID is provided for each location session.

In one implementation, a method for supporting location services for a user equipment (UE) performed by the UE includes receiving an initial message for a first location session and a first indication of the first location session from a network entity; receiving a final message for the first location session and a second indication of the first location session from the network entity; and receiving an initial message for a second location session and an indication of the second location session from the network entity, wherein at least one of the second indication of the first location session and the indication of the second location session indicate that the second location session is different from the first location session.

In one implementation, a user equipment (UE) for supporting location services for the UE includes at least one wireless transceiver configured to wirelessly communicate with at least one wireless network; memory configured to store instructions; and at least one processor coupled to the at least one wireless transceiver and the memory, the at least one processor configured by the instructions stored in the memory to: receive via the at least one wireless transceiver an initial message for a first location session and a first indication of the first location session from a network entity; receive via the at least one wireless transceiver a final message for the first location session and a second indication of the first location session from the network entity; and receive via the at least one wireless transceiver an initial message for a second location session and an indication of the second location session from the network entity, wherein at least one of the second indication of the first location session and the indication of the second location session indicate that the second location session is different from the first location session.

In one implementation, a user equipment (UE) for supporting location services for the UE, the UE includes means for receiving an initial message for a first location session and a first indication of the first location session from a network entity; means for receiving a final message for the first location session and a second indication of the first location session from the network entity; and means for receiving an initial message for a second location session and an indication of the second location session from the network entity, wherein at least one of the second indication of the first location session and the indication of the second location session indicate that the second location session is different from the first location session.

In one implementation, a non-transitory storage medium including program code stored thereon, the program code is operable to configure at least one processor in a user equipment (UE) for supporting location services for the UE, includes program code to receive an initial message for a first location session and a first indication of the first location session from a network entity; program code to receive a final message for the first location session and a second indication of the first location session from the network entity; and program code to receive an initial message for a second location session and an indication of the second location session from the network entity, wherein at least one of the second indication of the first location session and the indication of the second location session indicate that the second location session is different from the first location session.

In one implementation, a method for supporting location services for a user equipment (UE) performed by a location server includes sending an initial message for a first location session and a first indication of the first location session to a network entity; sending a final message for the first location session and a second indication of the first location session to the network entity; and sending an initial message for a second location session and an indication of the second location session to the network entity, wherein at least one of the second indication of the first location session and the indication of the second location session indicate that the second location session is different from the first location session.

In one implementation, a location server for supporting location services for a user equipment (UE) includes an external interface configured to communicate with a wireless network; memory configured to store instructions; and at least one processor coupled to the external interface and the memory, the at least one processor configured by the instructions stored in the memory to: send via the external interface an initial message for a first location session and a first indication of the first location session to a network entity; send via the external interface a final message for the first location session and a second indication of the first location session to the network entity; and send via the external interface an initial message for a second location session and an indication of the second location session to the network entity, wherein at least one of the second indication of the first location session and the indication of the second location session indicate that the second location session is different from the first location session.

In one implementation, a location server for supporting location services for a user equipment (UE), the location server includes means for sending an initial message for a first location session and a first indication of the first location session to a network entity; means for sending a final message for the first location session and a second indication of the first location session to the network entity; and means for sending an initial message for a second location session and an indication of the second location session to the network entity, wherein at least one of the second indication of the first location session and the indication of the second location session indicate that the second location session is different from the first location session.

In one implementation, a non-transitory storage medium including program code stored thereon, the program code is operable to configure at least one processor in a location server for supporting location services for a user equipment (UE), includes program code to send an initial message for a first location session and a first indication of the first location session to a network entity; program code to send a final message for the first location session and a second indication of the first location session to the network entity; and program code to send an initial message for a second location session and an indication of the second location session to the network entity, wherein at least one of the second indication of the first location session and the indication of the second location session indicate that the second location session is different from the first location session.

In one implementation, a method for supporting location services for a user equipment (UE) performed by a network entity includes receiving an initial message for a first location session for the UE and a first indication of the first location session from a location server; sending the initial message for the first location session and the first indication of the first location session to the UE; receiving a final message for the first location session and a second indication of the first location session from the location server; sending the final message for the first location session and the second indication of the first location session to the UE; receiving an initial message for a second location session for the UE and an indication of the second location session from the location server; and sending the initial message for the second location session and the indication of the second location session to the UE, wherein at least one of the second indication of the first location session and the indication of the second location session indicate that the second location session is different from the first location session.

In one implementation, a network entity for supporting location services for a user equipment (UE) performed by the network entity includes an external interface configured to communicate with a wireless network; memory configured to store instructions; and at least one processor coupled to the external interface and the memory, the at least one processor configured by the instructions stored in the memory to: receive via the external interface an initial message for a first location session for the UE and a first indication of the first location session from a location server; send via the external interface the initial message for the first location session and the first indication of the first location session to the UE; receive via the external interface a final message for the first location session and a second indication of the first location session from the location server; send via the external interface the final message for the first location session and the second indication of the first location session to the UE; receive via the external interface an initial message for a second location session for the UE and an indication of the second location session from the location server; and send via the external interface the initial message for the second location session and the indication of the second location session to the UE, wherein at least one of the second indication of the first location session and the indication of the second location session indicate that the second location session is different from the first location session.

In one implementation, a network entity for supporting location services for a user equipment (UE) performed by the network entity, the network entity includes means for receiving an initial message for a first location session for the UE and a first indication of the first location session from a location server; means for sending the initial message for the first location session and the first indication of the first location session to the UE; means for receiving a final message for the first location session and a second indication of the first location session from the location server; means for sending the final message for the first location session and the second indication of the first location session to the UE; means for receiving an initial message for a second location session for the UE and an indication of the second location session from the location server; and means for sending the initial message for the second location session and the indication of the second location session to the UE, wherein at least one of the second indication of the first location session and the indication of the second location session indicate that the second location session is different from the first location session.

In one implementation, a non-transitory storage medium including program code stored thereon, the program code is operable to configure at least one processor in a network entity for supporting location services for a user equipment (UE), includes program code to receive an initial message for a first location session for the UE and a first indication of the first location session from a location server; program code to send the initial message for the first location session and the first indication of the first location session to the UE; program code to receive a final message for the first location session and a second indication of the first location session from the location server; program code to send the final message for the first location session and the second indication of the first location session to the UE; program code to receive an initial message for a second location session for the UE and an indication of the second location session from the location server; and program code to send the initial message for the second location session and the indication of the second location session to the UE, wherein at least one of the second indication of the first location session and the indication of the second location session indicate that the second location session is different from the first location session.

BRIEF DESCRIPTION OF THE DRAWINGS

An understanding of the nature and advantages of various embodiments may be realized by reference to the following figures.

Figure 1:
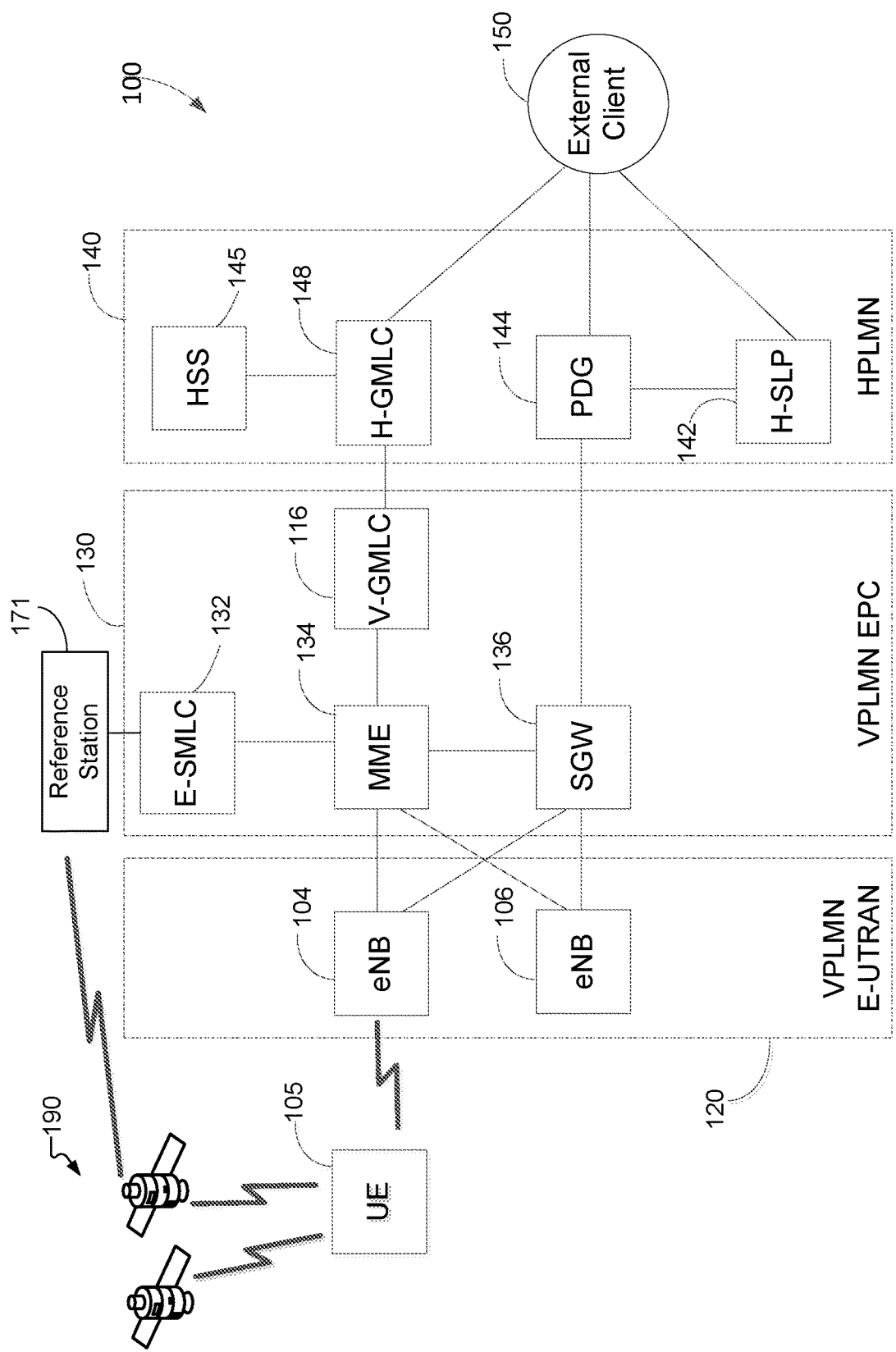
FIG. 1 is a simplified block diagram illustrating a communication system for roaming support of UE location using an Evolved Packet System (EPS).

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. When referring to such an element using only the first number, any instance of the element is to be understood (e.g. element 110 in the previous example would refer to elements 110-1, 110-2 and 110-3).

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

To support positioning of a mobile device, two broad classes of location solution have been defined: control plane and user plane. With control plane (CP) location, signaling related to positioning and support of positioning may be carried over existing network (and mobile device) signaling interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for mobile devices that use radio access according to Global System for Mobile communications GSM (2G), Universal Mobile Telecommunications System (UMTS) (3G), Long Term Evolution (LTE) (4G) and New Radio (NR) (5G). These solutions are defined in 3GPP TSs 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a mobile device accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The LS may be part of or accessible from a serving network or a home network for a UE or may simply be accessible over the Internet or over a local Intranet. If positioning of a UE is needed, an LS may instigate a session (e.g. a location session or a SUPL session) with the UE, coordinate location measurements by the UE and/or by network entities and enable determination of an estimated location of the UE. During a location session, an LS may request positioning capabilities of the UE (or the UE may provide them without a request), may provide assistance data to the UE (e.g. if requested by the UE or in the absence of a request) and may request a location estimate or location measurements from the UE, e.g. for the GNSS, OTDOA and/or Enhanced Cell ID (ECID) position methods. Assistance data may enable a UE to acquire and measure radio signals (e.g. GNSS and/or PRS signals), e.g. by providing expected characteristics of these signals such as frequency, expected time of arrival, signal coding, signal Doppler.

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using OTDOA).

In an alternative UE assisted mode of operation, a UE may return location measurements to an LS which may determine an estimated location of the UE based on these measurements and possibly based also on other known or configured data (e.g. satellite ephemeris data for GNSS location or base station characteristics including base station locations and possibly PRS timing in the case of terrestrial positioning using OTDOA).

In another standalone mode of operation, a UE may make location related measurements without any positioning assistance data from an LS and may further compute a location or a change in location without any positioning assistance data from an LS. Position methods that may be used in a standalone mode include GPS and GNSS (e.g. if a UE obtains satellite orbital data from data broadcast by GPS and GNSS satellites themselves) as well as sensors. It is noted that the terms "positioning assistance data", "location assistance data" and "assistance data" (AD) are used synonymously herein to refer to data which may be provided to a mobile device via broadcast or by point to point means to assist the mobile device to obtain location measurements (also referred to as positioning measurements) and/or to compute a location estimate from positioning measurements.

In the case of 3GPP CP location, an LS may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, an LS may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, an LS and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE access, in which case LPP or LPP/LPPe messages are exchanged between a UE and E-SMLC. LPP or LPP/LPPe messages may be exchanged between a UE and E-SMLC via a serving Mobility Management Entity (MME) and a serving eNodeB for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message. It is noted that while the LPP positioning protocol is discussed in the below description and illustrations in FIGS. 4-11, it should be understood that the description and illustrations are not limited to one particular positioning protocol, such as LPP.

An LS and a base station (e.g. an eNodeB for LTE access) may exchange messages to enable the LS to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol defined in 3GPP TS 36.455 may be used to transfer such messages between a base station that is an eNodeB and an LS that is an E-SMLC.

During a location session between a UE and an LS where LPP is used, the UE may receive multiple requests (conveyed in LPP messages) for location information (e.g. location measurements) for different position methods. For example, LPP or LPP/LPPe request messages for location information may be received for position methods, such as Global Navigation Satellite System (GNSS), Observed Time Difference of Arrival (OTDOA), enhanced Cell ID (ECID), LPPe position methods, Wireless Local Area Network (WLAN) positioning, uncompensated barometric pressure (UBP) (Baro Sensor) and Bluetooth-Low Energy (BTLE). A number of these request location information messages may arrive as independent messages within the same location session or as part of different location sessions. As a result, it may not always be possible for a UE to determine when a Network Initiated location session has ended. The inability to clearly define the end of a location session may be the source of errors. For example, some UEs may not have an ability to support more than one location session at a time, which may cause the UE to ignore or reject a received LPP message for a new LPP session when a previous LPP session has ended but is perceived by the UE to be still continuing. In another example, a UE may receive LPP messages for different LPP sessions but may erroneously treat all LPP messages as being part of the same LPP session which may cause memory problems for the UE in terms of storing information for all received LPP messages as part of one session Enhancements to a positioning protocol, such as including a session indication in one or more messages, as described below, may be used to indicate when one location session is different from another location session.

FIG. 1 is a diagram illustrating a communication system 100 for location support of a user equipment (UE) 105 that supports and is currently using Long Term Evolution (LTE) radio access (also referred to as wideband LTE) or Narrow Band Internet of Things (NB-IoT) radio access (also referred to as narrowband LTE), where NB-IoT and LTE may be as defined by 3GPP—e.g. in 3GPP TS 36.300. The communication system 100 may be referred to as an Evolved Packet System (EPS). As illustrated, the communication system 100 may include the UE 105, an Evolved Universal Mobile Telecommunications Service (UMTS) Terrestrial Radio Access (E-UTRA) Network (E-UTRAN) 120, and an Evolved Packet Core (EPC) 130. The E-UTRAN 120 and the EPC 130 may be part of a Visited Public Land Mobile Network (VPLMN) that is a serving network for the UE 105 and communicates with a Home Public Land Mobile Network (HPLMN) 140 for the UE 105. The VPLMN E-UTRAN 120, VPLMN EPC 130 and/or HPLMN 140 may interconnect with other networks. For example, the Internet may be used to carry messages to and from different networks such as the HPLMN 140 and the VPLMN EPC 130. For simplicity these networks and associated entities and interfaces are not shown. As shown, the communication system 100 provides packet-switched services to the UE 105. However, as those skilled in the art will readily appreciate, the various concepts presented throughout this disclosure may be extended to networks providing circuit-switched services.

The UE 105 may comprise any electronic device configured for NB-IoT and/or LTE radio access, for example. The UE 105 may be referred to as a device, a wireless device, a mobile terminal, a terminal, a mobile station (MS), a mobile device, a SET, or by some other name and may correspond to (or be part of) a smart watch, digital glasses, fitness monitor, smart car, smart appliance, cellphone, smartphone, laptop, tablet, PDA, tracking device, control device, or some other portable or moveable device. A UE 105 may comprise a single entity or may comprise multiple entities such as in a personal area network where a user may employ audio, video and/or data I/O devices and/or body sensors and a separate wireline or wireless modem. Typically, though not necessarily, a UE 105 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrow Band Internet of Things (NB-IoT), Enhanced Machine Type Communications (eMTC) also referred to as LTE category M1 (LTE-M), High Rate Packet Data (HRPD), 5G NR, WiMax, etc. VPLMN EPC 130 combined with VPLMN E-UTRAN 120, and HPLMN 140, may be examples of a WWAN. A UE 105 may also support wireless communication with one or more types of Wireless Local Area Network (WLAN) such as a WLAN supporting IEEE 802.11 WiFi or Bluetooth® (BT). UE 105 may also support communication with one or more types of wireline network such as by using a Digital Subscriber Line (DSL) or packet cable for example. Although FIG. 1 shows only one UE 105, there may be many other UEs that can each correspond to UE 105.

The UE 105 may enter a connected state with a wireless communication network that may include the E-UTRAN 120. In one example, UE 105 may communicate with a cellular communication network by transmitting wireless signals to, and/or receiving wireless signals from, a cellular transceiver, such as an evolved Node B (eNodeB or eNB) 104 in the E-UTRAN 120. The E-UTRAN 120 may include one or more additional eNBs 106. The eNB 104 provides user plane and control plane protocol terminations toward the UE 105. The eNB 104 may comprise a serving eNB for UE 105 and may also be referred to as a base station, a base transceiver station, a radio base station, a radio transceiver, a radio network controller, a transceiver function, a base station subsystem (BSS), an extended service set (ESS), or by some other suitable terminology. The UE 105 also may transmit wireless signals to, or receive wireless signals from, a local transceiver (not shown in FIG. 1), such as an access point (AP), femtocell, Home Base Station, small cell base station, Home Node B (HNB) or Home eNodeB (HeNB), which may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course, it should be understood that these are merely examples of networks that may communicate with a mobile device over a wireless link, and claimed subject matter is not limited in this respect.

Examples of network technologies that may support wireless communication include NB-IoT and LTE, but may further include GSM, CDMA, WCDMA, HRPD, eMTC and NR. NB-IoT, GSM, WCDMA, LTE, eMTC and NR are technologies defined by 3GPP. CDMA and HRPD are technologies defined by the 3rd Generation Partnership Project 2 (3GPP2). Cellular transceivers, such as eNBs 104 and 106, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

The eNBs 104 and 106 may be connected by an interface (e.g. the 3GPP S1 interface) to the VPLMN EPC 130. The EPC 130 includes a Mobility Management Entity (MME) 134, and a Serving Gateway (SGW) 136 through which data (e.g. Internet Protocol (IP) packets) to and from the UE 105 may be transferred. The MME 134 may be the serving MME for UE 105 and is then the control node that processes the signaling between the UE 105 and the EPC 130 and supports attachment and network connection of UE 105, mobility of UE 105 (e.g. via handover between network cells) as well as establishing and releasing data bearers on behalf of the UE 105. Generally, the MME 134 provides bearer and connection management for the UE 105 and may be connected to the SGW 136, the eNBs 104 and 106, an Enhanced Serving Mobile Location Center (E-SMLC) 132 and a Visited Gateway Mobile Location Center (V-GMLC) 116 in the VPLMN EPC 130.

The E-SMLC 132 may support location of the UE 105 using the 3GPP control plane (CP) location solution defined in 3GPP technical specifications (TSs) 23.271 and 36.305. The V-GMLC 116, which may also be referred to simply as a Gateway Mobile Location Center (GMLC) 116, may provide access on behalf of an external client (e.g. external client 150) or another network (e.g. HPLMN 140) to the location of UE 105. The external client 150 may comprise a web server or remote application that may have some association with UE 105 (e.g. may be accessed by a user of UE 105 via VPLMN E-UTRAN 120, VPLMN EPC 130 and HPLMN 140) or may be a server, application or computer system providing a location service to some other user or users which may include obtaining and providing the location of UE 105 (e.g. to enable a service such as friend or relative finder, asset tracking or child or pet location).

E-SMLC 132 may be connected to or have access to one or more reference stations 171 which may be part of VPLMN EPC 130 or separate from VPLMN EPC 130 (e.g. part of a GNSS reference network and owned and operated by a service provider different to the operator of VPLMN EPC 130). A reference station 171 may comprise or include a GNSS receiver configured to acquire, measure, and decode signals transmitted by one or more GNSSs. A reference station 171 may be configured to obtain or determine orbital and timing data for Satellite Vehicles (SVs) 190 for one or more GNSSs and infer information for environmental factors that can affect GNSS location such as ionospheric and tropospheric delay. A reference station 171 may transfer determined information to E-SMLC 132—e.g. periodically or whenever the determined information changes.

As illustrated, the HPLMN 140 includes a Home Gateway Mobile Location Center (H-GMLC) 148 that may be connected to the V-GMLC 116 (e.g. via the Internet), as well as a Packet Data Network Gateway (PDG) 144 that may be connected to the SGW 136 (e.g. via the Internet). The PDG 144 may provide UE 105 with Internet Protocol (IP) address allocation and IP and other data access to external networks (e.g. the Internet) and to external clients (e.g. external client 150) and external servers, as well as other data transfer related functions. In some cases, PDG 144 may be located in VPLMN EPC 130 and not in HPLMN 140 when the UE 105 receives local IP breakout. The PDG 144 may be connected to a location server, such as H-SLP 142. The H-SLP 142 may support the SUPL UP location solution defined by OMA and may support location services for UE 105 based on subscription information for UE 105 stored in H-SLP 142. In some embodiments of communication system 100, a Discovered SLP (D-SLP) or Emergency SLP (E-SLP) (not shown in FIG. 1), in or accessible from VPLMN EPC 130, may be used to locate UE 105 using the SUPL UP solution.

The H-GMLC 148 may be connected to a Home Subscriber Server (HSS) 145 for UE 105, which is a central database that contains user-related and subscription-related information for UE 105. The H-GMLC 148 may provide location access to the UE 105 on behalf of external clients such as external client 150. One or more of the H-GMLC 148, PDG 144, and H-SLP 142 may be connected to the external client 150, e.g., through another network, such as the Internet. In some cases, a Requesting GMLC (R-GMLC) located in another PLMN (not shown in FIG. 1) may be connected to H-GMLC 148 (e.g. via the Internet) in order to provide location access to UE 105 on behalf of external clients connected to the R-GMLC. The R-GMLC, H-GMLC 148 and V-GMLC 116 may support location access to the UE 105 using the 3GPP CP solution defined in 3GPP TS 23.271.

It should be understood that while a VPLMN network (comprising VPLMN E-UTRAN 120 and VPLMN EPC 130) and a separate HPLMN 140 are illustrated in FIG. 1; both PLMNs (networks) may be the same PLMN. In that case, (i) the H-SLP 142, PDG 144, and HSS 145, may be in the same network (EPC) as the MME 134, and (ii) the V-GMLC 116 and the H-GMLC 148 may comprise the same GMLC.

In particular implementations, the UE 105 may have circuitry and processing resources capable of obtaining location related measurements (also referred to as location measurements), such as measurements for signals received from GPS or other Satellite Positioning System (SPS) SVs 190, measurements for cellular transceivers such as eNBs 104 and 106, and/or measurements for local transceivers. UE 105 may further have circuitry and processing resources capable of computing a position fix or estimated location of UE 105 based on these location related measurements. In some implementations, location related measurements obtained by UE 105 may be transferred to a location server, such as the E-SMLC 132, H-SLP 142 or LMF 152 (described later for FIG. 2), after which the location server may estimate or determine a location for UE 105 based on the measurements.

Location related measurements obtained by UE 105 may include measurements of signals received from SVs 190 that are part of an SPS or Global Navigation Satellite System (GNSS) such as the Global Positioning System (GPS), GLONASS, Galileo or Beidou and/or may include measurements of signals received from terrestrial transmitters fixed at known locations (e.g., such as eNB 104, eNB 106 or other local transceivers). UE 105 or a separate location server (e.g. E-SMLC 132, H-SLP 142 or LMF 152) may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), Enhanced Cell ID (ECID), WiFi, or combinations thereof. In some of these techniques (e.g. A-GNSS, AFLT and OTDOA), pseudoranges or timing differences may be measured by UE 105 relative to three or more terrestrial transmitters fixed at known locations or relative to four or more SVs with accurately known orbital data, or combinations thereof, based at least in part, on pilot signals, positioning reference signals (PRS) or other positioning related signals transmitted by the transmitters or SVs and received at the UE 105. Here, location servers, such as E-SMLC 132, H-SLP 142 or LMF 152, may be capable of providing positioning assistance data to UE 105 including, for example, information regarding signals to be measured by UE 105 (e.g., expected signal timing, signal coding, signal frequencies, signal Doppler), locations and/or identities of terrestrial transmitters, and/or signal, timing and orbital information for GNSS SVs 190 to facilitate positioning techniques such as A-GNSS, AFLT, OTDOA and ECID. The facilitation may include improving signal acquisition and measurement accuracy by UE 105 and/or, in some cases, enabling UE 105 to compute its estimated location based on the location measurements. For example, a location server may comprise an almanac (e.g., a Base Station Almanac (BSA)) which indicates the locations and identities of cellular transceivers and transmitters (e.g. eNBs 104 and 106) and/or local transceivers and transmitters in a particular region or regions such as a particular venue, and may further contain information descriptive of signals transmitted by these transceivers and transmitters such as signal power, signal timing, signal bandwidth, signal coding and/or signal frequency. In the case of ECID, a UE 105 may obtain measurements of signal strength (e.g. received signal strength indication (RSSI) or reference signal received power (RSRP)) for signals received from cellular transceivers (e.g., eNBs 104, 106) and/or local transceivers and/or may obtain a signal to noise ratio (S/N), a reference signal received quality (RSRQ), or a round trip signal propagation time (RTT) between UE 105 and a cellular transceiver (e.g., eNB 104 or 106) or a local transceiver. A UE 105 may transfer these measurements to a location server, such as E-SMLC 132, H-SLP 142 or LMF 152, to determine a location for UE 105, or in some implementations, UE 105 may use these measurements together with positioning assistance data (e.g. terrestrial almanac data or GNSS SV data such as GNSS Almanac and/or GNSS Ephemeris information) received from the location server to determine a location for UE 105.

In the case of OTDOA, UE 105 may measure a Reference Signal Time Difference (RSTD) between signals, such as a Position Reference Signal (PRS) or Cell Specific Reference Signal (CRS), received from nearby transceivers or base stations (e.g. eNBs 104 and 106). An RSTD measurement may provide the time of arrival difference between signals (e.g. CRS or PRS) received at UE 105 from two different transceivers (e.g. an RSTD between signals received from eNB 104 and from eNB 106). The UE 105 may return the measured RSTDs to a location server (e.g. E-SMLC 132, H-SLP 142 or LMF 152) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

An estimate of a location of a UE 105 may be referred to as a location, location estimate, location fix, fix, position, position estimate or position fix, and may be geodetic, thereby providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of a UE 105 may also include an uncertainty and may then be expressed as an area or volume (defined either geodetically or in civic form) within which the UE 105 is expected to be located with some given or default probability or confidence level (e.g., 67% or 95%). A location of a UE 105 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location, which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level). Measurements (e.g. obtained by UE 105 or by another entity such as eNB 104) that are used to determine (e.g. calculate) a location estimate for UE 105 may be referred to as measurements, location measurements, location related measurements, positioning measurements or position measurements and the act of determining a location for the UE 105 may be referred to as positioning of the UE 105 or locating the UE 105.

Figure 2:
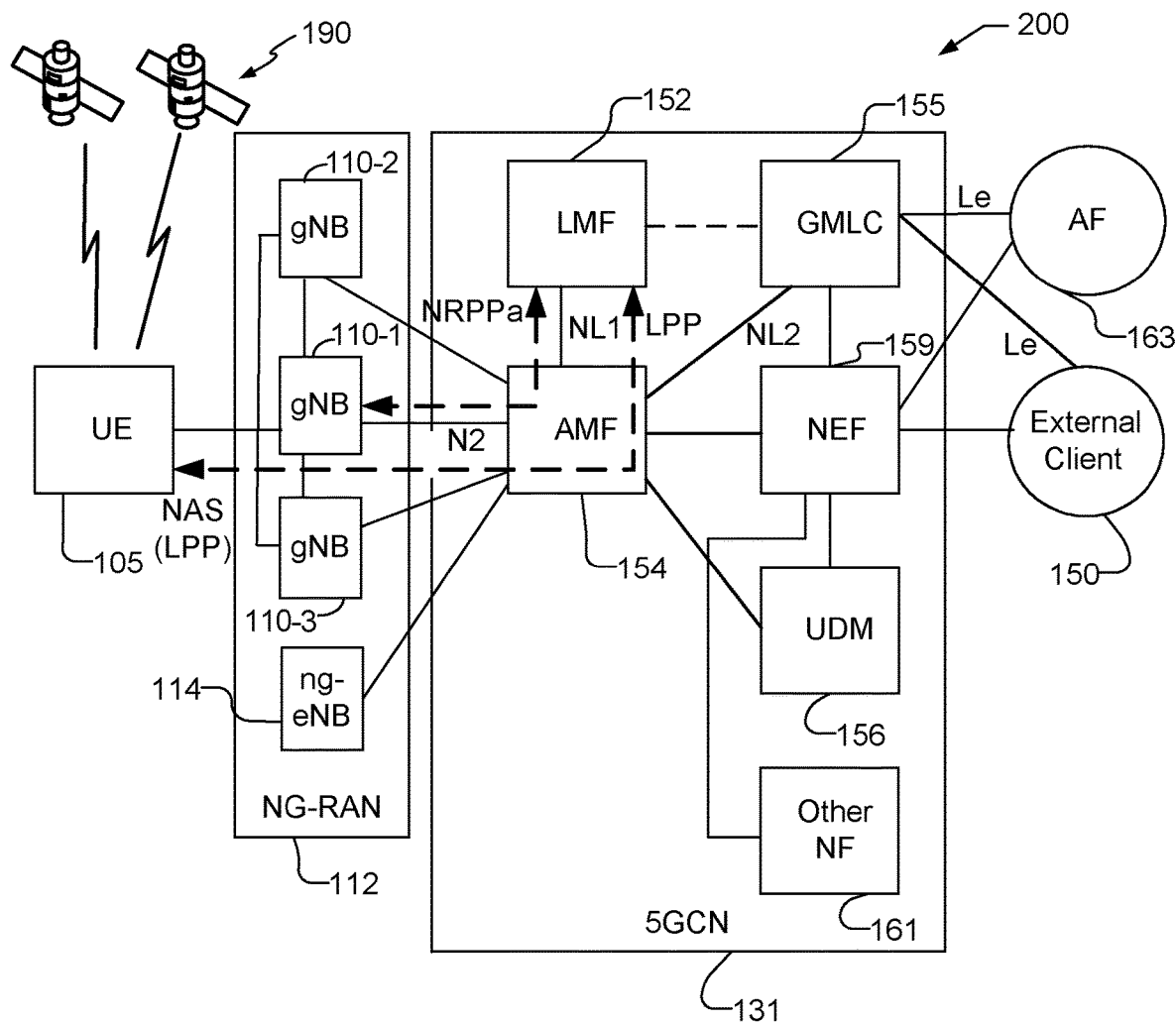
FIG. 2 is a simplified block diagram illustrating a communication system for non-roaming support of UE location using a 5G Core network (5GCN).

FIG. 2 is a simplified block diagram illustrating a communication system 200 for non-roaming support of UE location using a 5G CP location solution. The non-roaming communication system 200 comprises a UE 105 and components of a Fifth Generation (5G) network comprising a Next Generation Radio Access Network (NG-RAN) 112, which includes base stations (BSs) sometimes referred to as New Radio (NR) NodeBs (also referred to as gNBs) 110-1, 110-2 and 110-3 (collectively and generically referred to herein as gNBs 110), and a 5G Core Network (5GCN) 131 that is in communication with an external client 150. A 5G network may also be referred to as a New Radio (NR) network; NG-RAN 112 may be referred to as an NR RAN or a 5G RAN; and 5GCN 131 may be referred to as an Next Generation (NG) Core network (NGC). The communication system 200 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 200 are described below. The communication system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 200. Similarly, the communication system 200 may include a larger or smaller number of SVs 190, gNBs 110, external clients 150, and/or other components. The illustrated connections that connect the various components in the communication system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 2 illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 105 may communicate with an Access Network (AN), as opposed to an NG-RAN, and accordingly, component 112 is sometimes referred to herein as an AN or as a RAN, denoted by the term "(R)AN" or "(R)AN 112". In the case of an AN (e.g. IEEE 802.11 AN), the AN may be connected to a Non-3GPP Interworking Function (N3IWF) (e.g. in 5GCN 131) (not shown in FIG. 2), with the N3IWF connected to AMF 154.

A location server, such as the LMF 152, may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, OTDOA and ECID. The facilitation may include improving signal acquisition and measurement accuracy by UE 105 and, in some cases, enabling UE 105 to compute its estimated location based on the location measurements. For example, a location server (e.g. LMF 152) may comprise an almanac which indicates locations and identities of cellular transceivers and/or local transceivers in a particular region or regions such as a particular venue, and may provide information descriptive of signals transmitted by a cellular base station or AP (e.g. a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), or a round trip signal propagation time (RTT) between UE 105 and a cellular transceiver (e.g. a gNB 110) or a local transceiver (e.g. a WiFi access point (AP)). A UE 105 may transfer these measurements to a location server, such as LMF 152, to determine a location for UE 105, or in some implementations, may use these measurements together with assistance data (e.g. terrestrial almanac data or GNSS satellite data such as GNSS Almanac and/or GNSS ephemeris information) received from a location server (e.g. LMF 152) or broadcast by a base station (e.g. a gNB 110) in NG-RAN 112 to determine a location for UE 105.

The UE 105 may measure one or more of a Reference Signal Time Difference (RSTD), a Receive-Transmit (Rx-Tx) time difference, an Angle of Arrival (AOA), a Round Trip signal propagation Time (RTT), an Angle of Departure (ADD), a Reference Signal Strength Indication (RSSI), a Reference Signal Received Power (RSRP), a Reference Signal Received Quality (RSRQ). In the case of OTDOA, UE 105 may measure a Reference Signal Time Difference (RSTD) between signals such as a position reference signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS or PRS) received at UE 105 from two different transceivers. The UE 105 may return the measured RSTDs to a location server (e.g. LMF 152) which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS or GNSS receiver at each transceiver to accurately obtain the common universal time.

As shown in FIG. 2, pairs of gNBs 110 in NG-RAN 112 may be connected to one another, e.g., directly as shown in FIG. 2 or indirectly via other gNBs 110. Access to the 5G network is provided to UE 105 via wireless communication between the UE 105 and one or more of the gNBs 110, which may provide wireless communication access to the 5GCN 131 on behalf of the UE 105 using 5G NR. In FIG. 2, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 2 (e.g. gNB 110-2 or gNB 110-3) may be configured to function as positioning-only beacons which may transmit signals (e.g. directional PRS) to assist positioning of UE 105 but may not receive signals from UE 105 or from other UEs.

As noted, while FIG. 2 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 131. Thus, the NG-RAN 112 may include any combination of gNBs, evolved NodeBs (eNBs), or other types of base stations or access points. As an example, NG-RAN 112 may include one or more next generation eNBs (ng-eNBs) 114 which provide LTE wireless access to UE 105 and may connect to entities in 5GCN 131 such as AMF 154.

The gNBs 110 and/or the ng-eNB 114 can communicate with the Access and Mobility Management Function (AMF) 154, which, for positioning functionality, communicates with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105; NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), WLAN positioning, and/or other position methods. The LMF 152 may also process location service requests for the UE 105, e.g., received from the GMLC 155 or from the AMF 154. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105).

The GMLC 155 may support one or more GMLC location methods for obtaining a location of a UE 105. With a GMLC location method, GMLC 155 may support a location request for the UE 105 received from an external client 150 or from NEF 159 and may forward such a location request to the LMF 152 via the serving AMF 154 or directly. A location response from the LMF 152 (e.g. containing a location estimate for the UE 105) may be similarly returned to the GMLC 155 via the serving AMF 154 or directly, and the GMLC 155 may then return the location response (e.g., containing the location estimate) to the external client 150 or NEF 159. GMLC 155 may contain subscription information for an external client 150 and may authenticate and authorize a location request for UE 105 from external client 150. GMLC 155 may further initiate a location session for UE 105 by sending a location request for UE 105 to AMF 154 (e.g. which then forwards the request to LMF 152) and may include in the location request an identity for UE 105 and the type of location being requested (e.g. such as a current location or a sequence of periodic or triggered locations). In contrast to a traditional CP location solution where a GMLC 155 may send a location request for UE 105 to a serving AMF for UE 105 (e.g. AMF 154), GMLC 155 may only send a location request for UE 105 to an LMF such as LMF 152. This may reduce impacts to AMFs (e.g. AMF 154) and may enable more efficient location of UE 105.

As further illustrated in FIG. 2, the LMF 152 and the gNBs 110 may communicate using a New Radio Position Protocol A (which may be referred to as NPPa or NRPPa). NRPPa may be defined in 3GPP TS 38.455 and may be the same as, similar to, or an extension of, the LTE Positioning Protocol A (LPPa) defined in 3GPP Technical Specification (TS) 36.455, with NRPPa messages being transferred between the gNBs 110 and the LMF 152 via the AMF 154. As further illustrated in FIG. 2, LMF 152 and UE 105 may communicate using the LTE Positioning Protocol (LPP) defined in 3GPP TS 36.355, where LPP messages are transferred inside Non-Access Stratum (NAS) transport messages between the UE 105 and the LMF 152 via the AMF 154 and a serving gNB 110-1 for UE 105. For example, LPP messages may be transferred between the LMF 152 and the AMF 154 using a transport protocol (e.g. IP based) or a service based operation (e.g. using the Hypertext Transfer Protocol (HTTP)), and may be transferred between the AMF 154 and the UE 105 using a NAS transport protocol. The LPP protocol may be used to support positioning of UE 105 using UE assisted and/or UE based position methods such as A-GNSS, RTK, WLAN, OTDOA and/or ECID. The NRPPa protocol may be used to support positioning of UE 105 using network based position methods such as ECID (when used with measurements obtained by a gNB 110 or received from a gNB 110 from UE 105) and/or may be used by LMF 152 to obtain location related information from gNBs 110 such as parameters defining positioning reference signal (PRS) transmission from gNBs 110 for support of OTDOA.

With a UE assisted position method, UE 105 may obtain location measurements (e.g. measurements of RSSI, RTT, RSTD, RSRP and/or RSRQ for gNBs 110, ng-eNB 114 or WLAN APs, or measurements of GNSS pseudorange, code phase and/or carrier phase for SVs 190) and may send the measurements to a location server (e.g. LMF 152) for computation of a location estimate for UE 105. With a UE based position method, UE 105 may obtain location measurements (e.g. which may be the same as or similar to location measurements for a UE assisted position method) and may compute a location of UE 105 (e.g. with the help of assistance data received from a location server such as LMF 152 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ or TOA for signals transmitted by UE 105) and/or may receive measurements obtained by UE 105, and may send the measurements to a location server (e.g. LMF 152) for computation of a location estimate for UE 105.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the 5GCN 131.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), WLAN, and/or OTDOA (or some other position method). In the case of OTDOA, the LPP message may instruct the UE 105 to obtain one or more measurements (e.g. RSTD measurements) of PRS signals transmitted within particular cells supported by particular gNBs 110 (or supported by one or more ng-eNBs 114 or eNBs). The UE 105 may send the measurements back to the LMF 152 in an LPP message (e.g. inside a 5G NAS message) via the serving gNB 110-1 and the AMF 154.

In some embodiments, LPP may be augmented by or replaced by an NR or NG positioning protocol (NPP or NRPP) which supports position methods such as OTDOA and ECID for NR radio access. For example, an LPP message may contain an embedded NPP message or may be replaced by an NPP message.

When NG-RAN 112 includes one or more ng-eNBs 114, an ng-eNB 114 may communicate with LMF 152 using NRPPa in order to support positioning of UE 105 (e.g. using a network based position method) and/or may enable transfer of LPP and/or NPP messages between UE 105 and LMF 152 via the ng-eNB 114 and AMF 154. An ng-eNB 114 and/or a gNB 110 in NG-RAN 112 may also broadcast positioning assistance data to UEs such as UE 105.

As illustrated, a Unified Data Management (UDM) 156 may be connected to the AMF 154. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management. The UDM 156 may be connected to GMLC 155 (not shown in FIG. 2) and/or to NEF 159.

To support services including location services from external clients 150 for Internet of Things (IoT) UEs, a Network Exposure Function (NEF) 159 may be included in 5GCN 131. The NEF 159 may support secure exposure of capabilities and events concerning 5GCN 131 and UE 105 to an external client 150, Application Function (AF) 163 or Network Function (NF) 161 and may enable secure provision of information from external client 150, AF 163 or NF 161 to 5GCN 131. In the context of location services, NEF 159 may function to obtain a current or last known location for a UE 105, may obtain an indication of a change in location for a UE 105, or an indication of when a UE 105 becomes available (or reachable). An external client 150 or external AF 163 may access NEF 159 directly or may access a Services Capability Server (SCS, not shown in FIG. 2), which may access NEF 159 on behalf of external client 150 in order to provide location information to the external client 150 or AF 163 for UE 105 via the SCS. The NEF 159 may be connected to the GMLC 155 to support last known location, current location and/or deferred periodic and triggered location for the UE 105 using a GMLC location method supported by GMLC 155. NEF 159 may also or instead be connected to the AMF 154 to support last known location, current location and/or deferred periodic and triggered location for the UE 105 by sending a subscription request for UE 105 location to AMF 154, which may avoid a need to use a GMLC 155.

Figure 3:
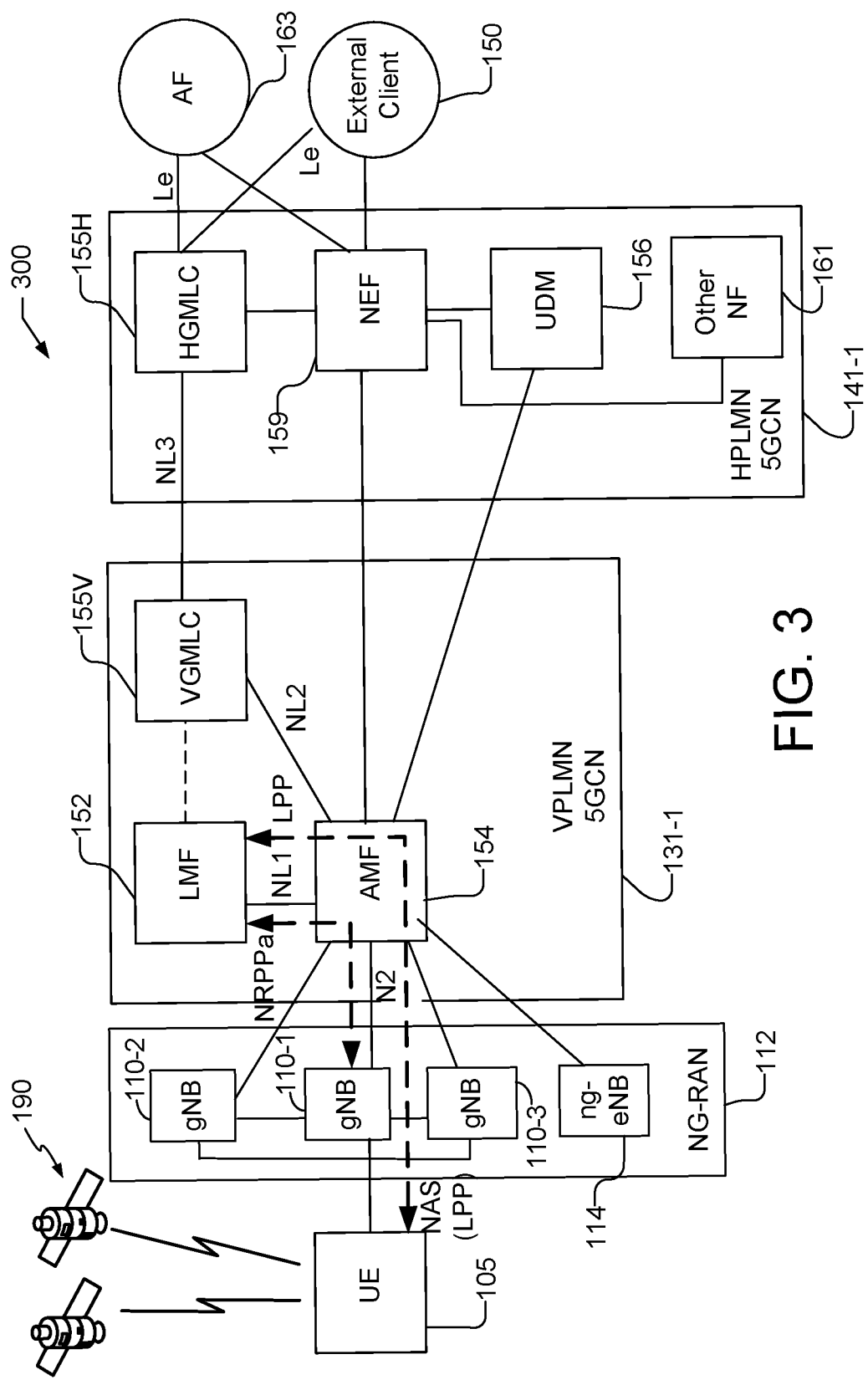
FIG. 3 is a simplified block diagram illustrating a communication system for roaming support of UE location using a 5GCN.

FIG. 3 illustrates a communication system 300 that is similar to the communication system 200 shown in FIG. 2, but supports location for a roaming UE 105. In the communication system 300, the core network 5GCN 131-1 that is in communication with the UE 105 via the NG-RAN 112 is a visited network, i.e., Visited Public Land Mobile Network (VPLMN), which is in communication with a home network 5GCN, i.e., Home Public Land Mobile Network (HPLMN)

141-1. In communication system 300, the VPLMN 5GCN 131-1 includes the Location Management Function (LMF) 152. The LMF 152 in communication system 300 may perform the same or almost the same functions and operations as LMF 152 in the non-roaming communication system of FIG. 2. The VPLMN 5GCN 131-1 also includes a Visited Gateway Mobile Location Center (VGMLC) 155V, which is similar to the GMLC 155 in the non-roaming communication system of FIG. 2, and is designated as 155V to indicate that it is located in the visited network for UE 105. As illustrated in FIG. 3, the VGMLC 155V connects to the AMF 154 and may connect to the LMF 152 in the VPLMN 5GCN 131-1.

As illustrated, HPLMN 5GCN 141-1 may include a Home GMLC (HGMLC) 155H that may be connected to the VGMLC 155V (e.g., via the Internet). The HGMLC 155H may be similar to the GMLC 155 in the non-roaming communication system of FIG. 2, and is designated as 155H to indicate that it located in the home network for UE 105. The VGMLC 155V and HGMLC 155H may be sometimes collectively and generically referred to herein as GMLC 155. The HGMLC 155H is in communication with the external client 150 in the HPLMN 141-1 and optionally with AF 163. The NEF 159 may also be in communication with the external client 150 and/or AF 163 and may operate as NEF 159 as discussed in FIG. 2. The NEF 159 may provide location access to UE 105 on behalf of external clients such as external client 150 and/or AF 163 as discussed in FIG. 2. One or more of the NEF 159 and HGMLC 155H may be connected to external client 150 and/or AF 163, e.g., through another network, such as the Internet. In some cases, an NF 161 in HPLMN 141-1 may request the location of UE 105 from NEF 159 as discussed in FIG. 2.

The terms location session, session, positioning session, LPP session, LPP location session and LPP positioning session are used synonymously herein, During an LPP positioning session, the location server, e.g., E-SMLC 132 or LMF 152, and the UE 105 exchange a number of LPP messages. LPP message types exchanged during an LPP positioning session, for example, may include an LPP Request Capabilities, an LPP Provide Capabilities, an LPP Request Assistance Data, an LPP Provide Assistance Data, an LPP Request Location Information and an LPP Provide Location Information. Each LPP message may include an acknowledgment request, an acknowledgement indicator, a transaction identifier (ID), an end of transaction indicator, and/or a sequence number in a header portion of the LPP message. The body of each LPP message, which may be empty, or may contain information specific to a particular LPP message type. Each type of LPP message may contain information specific to one or more positioning methods and/or information common to all positioning methods, such as Assisted Global Navigation Satellite System (A-GNSS), Observed Time Difference of Arrival (OTDOA), enhanced Cell ID (ECID), LPPe position methods, Wireless Local Area Network (WLAN) positioning, uncompensated barometric pressure (UBP) (Baro Sensor) and Bluetooth-Low Energy (BTLE).

In conventional implementations of LPP positioning sessions, LPP messages may be sent by the location server and received by the UE as independent LPP messages within an LPP location session. An LPP location session may typically comprise a number of LPP messages exchanged between the UE 105 and the LS (e.g. E-SMLC 132 or LMF 152) for the purpose of transferring assistance data to UE 105 and/or determining a location estimate for UE 105 (e.g. by the LS). Each LPP message may belong to an LPP transaction and thus an LPP location session may also comprise one or more LPP transactions. When the purpose of an LPP location session has been achieved, or if some error or failure occurs which prevents the purpose of an LPP location session from being achieved, the LPP location session may be terminated (e.g. by the LS). Although the UE 105 can be aware of which LPP messages belong to the same LPP transaction (e.g. via inclusion of the transaction ID in each LPP message which may indicate a particular LPP transaction), the UE 105 may not be unambiguously aware of which LPP messages belong to the same LPP session. Accordingly, with conventional implementations of an LPP positioning session, determining when a Network Initiated LPP session has ended may not be possible by UE 105.

Accordingly, an enhancement to an existing LPP protocol may be used to indicate when one location session is different from another location session, when a location session has started and/or when a location session has ended. For example, in one technique, different correlation identifiers (IDs) may be allocated by a network entity, such as MME 134 or AMF 154, and included in one or more messages (e.g. NAS transport messages used to transport LPP messages), which may be used to identify different location sessions. For example, in this technique, the network entity may allocate a different correlation ID for each new location request for a UE 105 which is received from another entity (e.g. V-GMLC 116 or GMLC 155). For example, the network entity may allocate a correlation ID with a value of zero for a first location request for the UE 105, may then allocate a correlation ID with a value of one for a second location request for the UE 105, may then further allocate a correlation ID with a value of two for a third location request for the UE 105, and so on. The different correlation IDs may be allocated even if earlier location requests have been completed and have ended. For example, if the first location request has a correlation ID of zero and has already ended when the network entity receives the second location request for UE 105, the network entity may still assign a correlation ID of one to the second location request. This may be needed as UE 105 may not be aware that the LPP location session for the first location request has ended, but, by detecting the different correlation ID for the LPP location session for the second location request, UE 105 can determine that this LPP location session is different, which may enable UE 105 to infer that the LPP location session for the first location request has ended (e.g. following some timeout period of 10-20 seconds for example). The correlation ID may be included by the network entity in all NAS transport messages sent to the UE 105 carrying an LPP message as part of a location session to support this location request. By observing the correlation ID in received NAS transport messages carrying an LPP message, the UE 105 can be aware of which LPP message belong to the same LPP session (due to being associated with the same correlation ID) and which LPP messages belong to different LPP sessions (due to being associated with different correlation IDs).

In another technique, the location server (e.g. E-SMLC 132 or LMF 152) may assign a different session ID (also referred to as an LPP session ID) for each location request for a target UE 105 received from another entity (e.g. MME 134, AMF 154, V-GMLC 116 or GMLC 155) and may include the session ID in all LPP messages sent to the UE 105 as part of the same LPP location session to obtain the requested location. By observing the session ID in received LPP messages, the UE 105 can be aware of which LPP message belong to the same LPP session (due to including the same session ID) and which LPP messages belong to different LPP sessions (due to including different session IDs).

In another technique, the location server may include an indicator, such as a "start session flag", in the initial (e.g. first) LPP message sent to the UE 105 for a new location session S1 to indicate that the LPP message is the initial LPP message for the new location session S1. In this technique, a correlation ID or a session ID may also be sent within or associated with each LPP message sent to the UE 105 for the location session S1 as described for the two previous techniques. However, unlike the two previous techniques, the correlation ID or session ID may be different to the correlation ID or session ID, respectively, for any other LPP session ongoing at the same time as the session S1 but may not be different to the correlation ID or session ID, respectively, for an LPP session S2 which either starts after session S1 has ended or ends before session S1 has started. Because of this, the UE 105 may not normally be able to distinguish LPP messages for session S1 from LPP messages for session S2. However, by observing the "start session flag", the UE 105 may observe the start of session S1 (and may thereby conclude that a previous session S2 has ended) or may observe the start of session S2 (e.g. and may thereby conclude that a previous session S1 has ended).

In a further technique, the location server may additionally or alternatively provide an indicator, such as an "end session flag", in the final (e.g. last) LPP message sent by an LS to UE 105 for some location session. For example, in some embodiments, the final LPP message may be an LPP acknowledgement message sent by the LS in response to (e.g.) an LPP Provide Location Information message sent to the LS by the UE 105 to provide final location measurements or a location estimate. In another example, the final LPP message may be an extra LPP message sent by the LS when the location session is known to have ended. As with the "start session flag", the UE 105 may use the "end session flag" to determine that an ongoing location session has ended and that any further LPP messages received from the LS which include or are associated with a session ID or correlation ID which is the same as for the location session which has ended are LPP messages for a new and thus different location session.

In some implementations of communication system 200 of FIG. 2 and communication system 300 of FIG. 3, a location server may be included in NG-RAN 112, e.g. as part of a gNB 110 or separate from but connected to one or more gNBs 110. A location server in NG-RAN 112 may be referred to as a Location Management Component (LMC) or as a Local LMF. An LS in NG-RAN 112 may receive a location request for UE 105, e.g. from AMF 154 via a gNB 110. The LS in NG-RAN 112 may then initiate an LPP location session with UE 105 to transfer assistance data to UE 105, obtain location measurements from UE 105 and/or obtain a location estimate for UE 105. The various techniques described herein to enable UE 105 to know when an LPP location session has started and/or ended and to distinguish one LPP location session from another LPP location session may be used for an LPP location session between an LS in NG-RAN 112 and UE 105. For example, the procedure described for FIG. 4 may be applicable when LMF 152 is replaced by an LS in NG-RAN 112.

Figure 4:
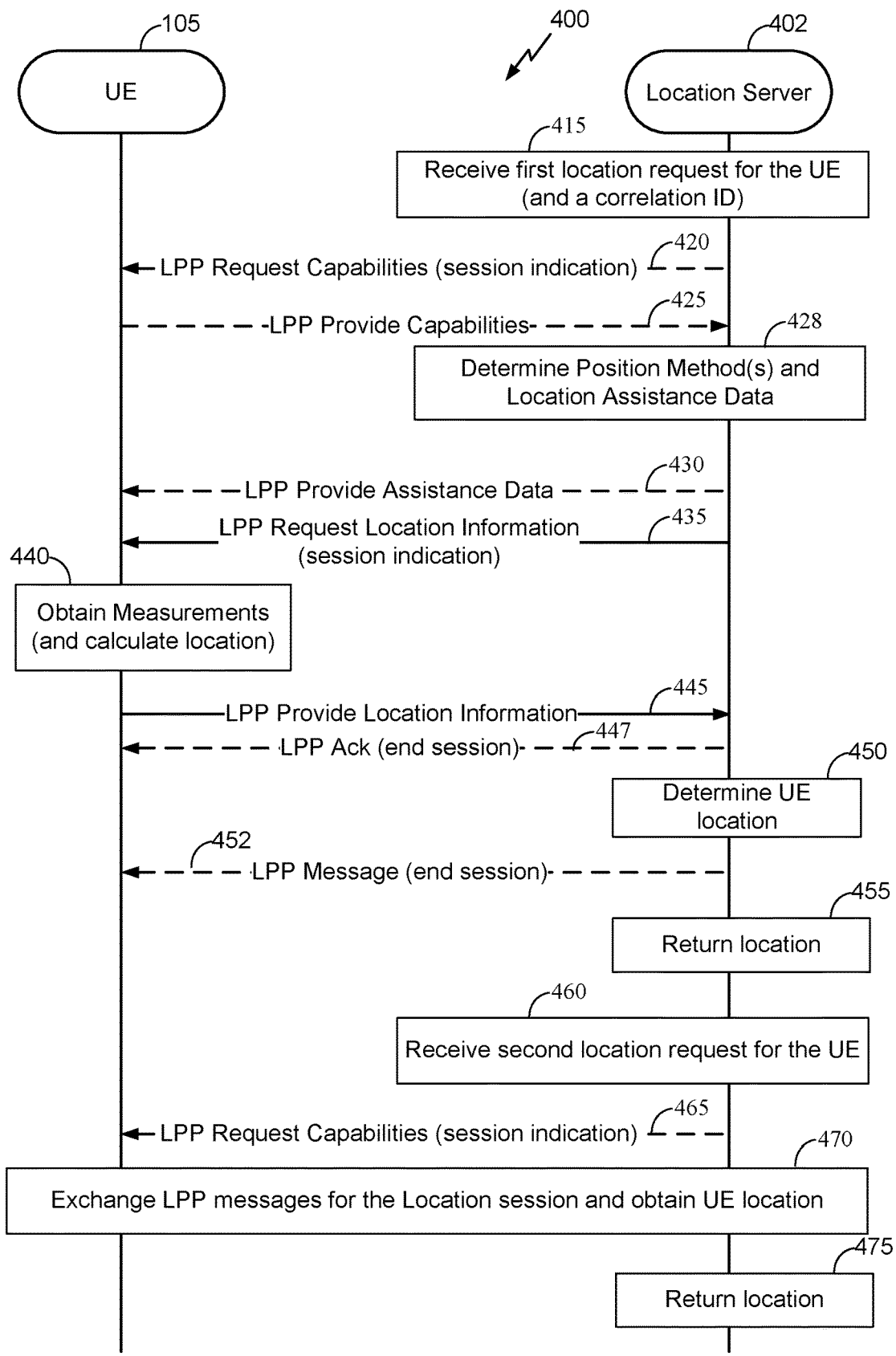
FIG. 4 shows a signaling flow illustrating various enhancements to an LPP protocol to indicate when one location session is different from another location session.

FIG. 4 shows a signaling flow 400, applicable to communication system 100, 200, or 300 shown in FIG. 1, 2, or 3, respectively, illustrating various enhancements to the LPP protocol to indicate when one location session is different from another location session (or when one location session has started or ended). Signaling flow 400 illustrates messages exchanged between a UE 105 and a location server 402, which may be, e.g., E-SMLC 132 or LMF 152. It can be noted that here, messages are provided in accordance with the 3GPP LPP protocol as an example. However, embodiments are not so limited (e.g. NPP or a combination of LPP and LPPe, referred to as LPP/LPPe, might be used in another embodiment). The location server 402 may send and receive messages to and from the UE 105 (e.g. at actions 420, 425, 430, 435, 445, 447, 452 and 465 described below) via one or more intermediate network entities, such as MME 134 or AMF 154.

At block 415, a location session may be initiated when the location server 402 receives a location request for the UE 105, e.g., from the External Client 150 via the GMLC 155, GMLCs 116 and 148 or 155V and 155H and MME 134 or AMF 154. In one implementation, the location server 402 may receive a correlation identifier (ID), e.g., allocated by the MME 134 or AMF 154, with the location request to identify the location session, i.e., different correlation IDs are assigned to different location sessions. In some implementations, the location server 402 may determine a session ID associated with the present location session.

At action 420, the location server 402 may optionally request capability information from the UE 105 by sending a LPP Request Capabilities message to the UE 105. The LPP Request Capabilities message, in some embodiments, may include a session indication. For example, the session indication in the LPP Request Capabilities message may be the correlation ID received in block 415, which specifically identifies the location session. In another implementation, the session indication may be a session identification (ID), e.g., that may be determined by the location server 402 at block 415, that is specific to the present location session. In some implementations, the session ID may be included in all LPP messages sent by the location server 402 to the UE 105 to support the location request received at block 415 and possibly in all LPP messages sent by the UE 105 to the location server 402 which are sent in response to or otherwise associated with LPP messages carrying the session ID sent by the location server 402 and received by the UE 105. In another implementation, the LPP Request Capabilities message may include a new session indicator, such as a new session flag, that indicates that the LPP Request Capabilities message 415 is an initial LPP message for a new location session. The session indication, e.g., correlation ID, session ID or a new session indicator, may be included as part of common Information Elements (IEs) in the LPP Request Capabilities message.

At action 425, capability information is provided by UE 105 in an LPP Provide Capabilities message sent by the UE 105 to the location server 402. The capability information may be provided by the UE 105 in response to the LPP Request Capabilities message or may be provided without a request, in which case action 420 may not occur. The LPP Provide Capabilities message from the UE 105 may be sent in accordance with the LPP protocol providing various location-related capabilities of UE 105, such as capabilities to support different position methods such as Assisted GNSS (A-GNSS), OTDOA, RTK, Enhanced Cell ID (ECID), and support for different network measurements and assistance data etc.

At block 428, the location server 402 may determine one or more position methods to be used to locate the UE 105 and location assistance data to be provided to the UE 105 based at least in part on the capability information received from the UE 105 at action 425. The location server 402 may also determine preferred position methods and preferred position modes (e.g. UE based versus UE assisted positioning) for the UE 105 based on the capability information provided by the UE 105.

At action 430, the location server 402 may send the UE 105 an LPP Provide Assistance Data (PAD) message, in response to receiving the LPP Provide Capabilities message at action 425 and determining the location assistance data at block 428. The LPP Provide Assistance Data message, in some embodiments, may include a session indication. For example, the LPP Provide Assistance Data message may include the correlation ID, which may be assigned to the location session. In another implementation, the LPP Provide Assistance Data message may include the session ID, e.g., determined by the location server 402, that is specific to the present location session. The session ID, for example, may be included in the LPP Provide Assistance Data message if the LPP Request Capabilities message 420 previously provided the session ID or if the LPP Provide Assistance Data message 430 is the first message in a location session. In another implementation, for example, where the LPP Request Capabilities message 420 was not sent by the location server 402, and the LPP Provide Assistance Data message is the first message in a location session, the LPP Provide Assistance Data may include a new session indicator, such as a new session flag, that indicates that the Provide Assistance Data message 430 is for a new location session. The session indication, e.g., session ID or new session indicator, may be included as part of common IEs in the LPP Provide Assistance Data message. The PAD message may include the AD determined in block 428. The AD provided in the LPP Provide Assistance Data message can be commensurate with the capabilities of the UE 105, as indicated in the LPP Provide Capabilities message. For example, if the UE 105 indicates that it is capable of obtaining location-related measurements for OTDOA, the location server 402 may provide a list of nearby cells (e.g. based on a current serving cell or serving eNB 104 for the UE 105) and information (e.g. timing, frequency, bandwidth) for signals (e.g. PRS or CRS signals) transmitted within these cells by corresponding base stations (e.g. eNB 104 and eNB 106), which may enable RSTD measurements by UE 105. Similarly, if UE 105 indicates support of A-GNSS in the LPP Provide Capabilities message sent at action 425, the location server 402 may include information for visible SVs 190 in the LPP Provide Assistance Data message sent at action 430. In one embodiment, action 430 may be preceded by UE 105 sending an LPP Request Assistance Data message to location server 402 to request assistance data (not shown in FIG. 4).

At action 435, the location server 402 sends an LPP Request Location Information message to the UE 105. The LPP Request Location Information message, in some embodiments, may include a session indication. For example, the LPP Request Location Information message may include the correlation ID, which may be assigned to the location session. In another implementation, the LPP Request Location Information message may include the session ID, e.g., determined by the location server 402, that is specific to the present location session. The session ID, for example, may be included in the LPP Request Location Information message if the LPP Request Capabilities message 420 (and/or LPP Provide Assistance Data message 430) previously provided the session ID or if the LPP Request Location Information message 435 is the first message in a location session. In another implementation, for example, where the LPP Request Capabilities message 420 and the LPP Provide Assistance Data message 430 were not sent by the location server 402, and the LPP Request Location Information message is the first message in a location session, the LPP Request Location Information message may include a new session indicator, such as a new session flag, that indicates that the LPP Request Location Information message 435 is for a new location session. The session indication, e.g., session ID or new session indicator, may be included as part of common IEs in the LPP Request Location Information message. The Request Location Information message 435 from the location server 402 may request location-related measurements (e.g. measurements for A-GNSS, OTDOA and/or RTK). In some embodiments, the LPP Request Location Information message may request that UE 105 compute a location estimate from these measurements (e.g. if the position method is UE based OTDOA or UE based A-GNSS) and may also include a requested accuracy for any location measurements or location estimate and/or a maximum response time. In some embodiments, the LPP Request Location Information message may be a request for location information for one or more position methods determined in block 428 based on the capabilities information provided at action 425.

At block 440, the UE 105 may obtain the location information requested at action 435. The location information, for example, may be location related measurements obtained by UE 105 for RF signals transmitted by base stations, such as eNBs 104 and 106 or gNBs 110, and/or SVs 190. For example, location related measurements may include measurements of RSTD obtained by measuring PRS or other reference signals (e.g. CRS signals) transmitted by base stations, measurements of RTT obtained by measuring signals transmitted from and/or to the base stations, and/or measurements of pseudorange, code phase or carrier phase obtained by measuring one or more navigation signals transmitted by each of one or more SVs 190. In some embodiments, UE 105 may also calculate a location estimate based on the obtained location measurements. The UE 105 may use AD received at action 430 to help obtain the location measurements and/or determine any location estimate.

At action 445, information indicative of one or more location-related measurements (e.g. a location estimate or the location measurements) obtained at block 440 is sent to the location server 402 by the UE 105 in an LPP Provide Location Information message. The LPP Provide Location Information message may include any session indication received in the LPP Request Location Information sent at action 435.

At action 447, the location server 402 optionally sends an LPP Ack message acknowledging receipt of the Provide Location Information message 445, which may be the final message in the first location session. The LPP Ack message sent at action 447 may include a session indication. For example, the LPP Ack message may include the correlation ID, which may be assigned to the location session. In another implementation, the LPP Ack message may include the session ID, e.g., determined by the location server 402, that is specific to the present location session. In another implementation, the session indication may be an end session indicator, such as an end session flag, that indicates the end of the location session. The session indication, e.g., session ID and/or end session indicator, may be included as part of common IEs in the LPP Ack message 447 or as part of an LPP message header.

At block 450, the location server 402 can use the location information received at action 445 (comprising one or more location-related measurements or a location estimate) to determine (e.g. calculate or verify) an estimated location of the UE 105.

At action 452, the location server 402 may optionally send an extra LPP message with a session indication, e.g., indicating the end of the location session. For example, action 452 may occur if action 447 does not occur. For example, the extra LPP message 452 may include the correlation ID, which may be assigned to the location session. In another implementation, the extra LPP message 452 may include the session ID, e.g., determined by the location server 402, that is specific to the present location session. In another implementation, the extra LPP message 452 may include an end session flag (e.g. as part of the session indication), that indicates the end of the location session.

At block 455, the location server 402 may return the determined location estimate (and any accompanying uncertainty or expected error, if determined) to the requesting entity. If desired, block 455 may occur before or after action 452, if the extra LPP message is used.

At action 460, a new location session is initiated when the location server 402 receives a second location request for the UE 105, e.g., from the external client 150 via GMLC 155, the GMLCs 116 and 148 or 155V and 155H and MME 134 or AMF 154. Action 460 may occur after action 415 and after block 455 in some embodiments. Action 460 may occur after action 415 but before block 455 in some other embodiments in which the first and second location sessions may partly or completely overlap in time. Similar to the first location request 415, the second location request 460 may include a correlation ID, e.g., allocated by the MME 134 or AMF 154, that may be used to specifically identify the location session, i.e., the correlation ID in the first location request 415 and the second location request 460 are different. In some implementations, the location server 402 may determine a new session ID associated with the second location session, which is different than the session ID associated with the first location session.

At action 465, the location server 402 may request capability information from the UE 105 for the new location session by sending a LPP Request Capabilities messages to the UE 105. As with the LPP Request Capabilities message 420, the Request Capabilities message 465 may include a session indication. For example, Request Capabilities message 465 may include the new session ID, determined by the location server 402 in block 460, that is different than the session ID included in the first Request Capabilities message 420. In another implementation, the Request Capabilities message 465 may include a new session indicator, such as a new session flag, that indicates that the Request Capabilities message 465 is an initial LPP message for a new location session. The session indication, e.g., session ID or new session indicator, may be included as part of common IEs in the LPP Request Capabilities message.

At block 470, the UE 105 and location server 402 exchange LPP messages for the second location session and obtain the UE location, similar to the messages, actions and blocks 425, 428, 430, 435, 440, 445, 447, 450, and 452 for the first location session. As discussed above, a session indication, such as a session ID for the second session, or new session flag for the second location session may be included in a Request Location Information message (e.g. if a Request Capabilities message 465 is not sent by the location server 402). Further, an LPP Ack message sent in response to an LPP message (e.g. an LPP Provide Location Information message) from the UE 105 may include a session indication, such as a session ID for the second session or an end session indicator and/or an extra LPP message may be sent with a session indication, e.g., indicating the end of the second session.

At block 475, the location server 402 may return the determined location estimate (and any accompanying uncertainty or expected error, if determined) for the second location session to the requesting entity.

Figure 5:
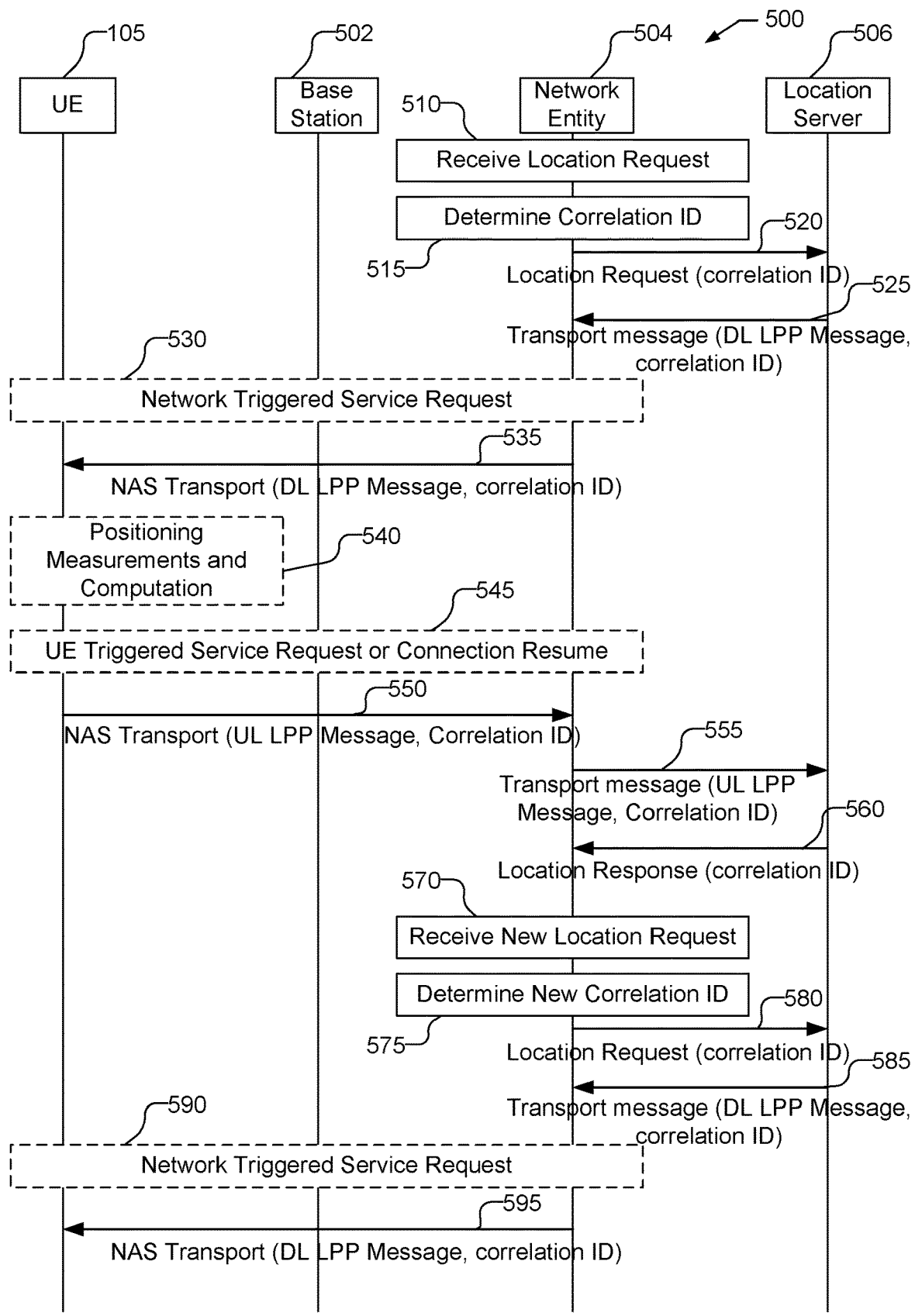
FIG. 5 shows a signaling flow illustrating use of correlation ID as an enhancement to the LPP protocol to indicate when one location session is different from another location session.

FIG. 5 shows a signaling flow 500, applicable to communication system 100, 200, or 300 shown in FIG. 1, 2, or 3, respectively, illustrating use of a correlation ID as an enhancement to the LPP protocol to indicate when one location session is different from another location session. Signaling flow 500 illustrates messages exchanged between a UE 105, base station 502, which may be, e.g., eNB 104, ng-eNB 114 or gNB 110, a network entity 504, such as MME 134 or AMF 154, and a location server 506, which may be, e.g., E-SMLC 132 or LMF 152.

At block 510, the network entity 504 may receive a location request for the UE 105, e.g., from the External Client 150 via the GMLC 155, the GMLCs 116 and 148 or the GMLCs 155V and 155H.

At block 515, the network entity 504 determines a correlation identifier (ID) for the present location session. Generally, a correlation ID is allocated by a network entity 504 such that it can be used to identify the location server 506, e.g., E-SMLC 132 or LMF 152, serving the location session, the UE 105 and the location request received at block 510. The network entity 504 may assign the correlation ID to additionally identify the location session, e.g., where each different location session is assigned a different correlation ID.

At action 520, the network entity 504 sends the location request, with the correlation ID, to the location server 506 to initiate the location session.

At action 525, the location server 506 sends a transport message to the network entity 504 (e.g. an LCS Application Protocol (LCS-AP) transport message for LTE access by UE 105) carrying the correlation ID and a Downlink (DL) LPP message, which may request location information from the UE 105, provide assistance data to the UE 105 or query for the UE capabilities.

At block 530, if the UE 105 is not using Control Plane CIoT (Cellular IoT) EPS Optimization and if the UE 105 is in ECM-IDLE state (e.g. if a signaling connection between UE 105 and network entity 504 and was previously released due to data and signaling inactivity), the network entity 504 performs a network triggered service request in order to establish or re-establish a signaling connection with UE 105. If the UE 105 is using Control Plane CIoT EPS Optimization, procedures for Mobile Terminated Data Transport in Control Plane CIoT EPS optimization may be performed by the network entity 504 at block 530 to establish a signaling connection with the UE 105.

At action 535, the network entity 504 forwards the Downlink LPP message to the UE 105 via the serving base station 502 in a NAS Transport message. The network entity 504 includes in the NAS transport message, the correlation ID associated with the present location session between the network entity 504 and location server 506.

It should be understood that actions 525 and 535 (and block 530 if performed) may be equivalent to any of actions 420, 430 and 435, 447, and 452 shown in FIG. 4, which unlike FIG. 5, does not illustrate the intervening entities between the location server and UE, such as a network entity and base station. In addition, actions 525 and 535 may be repeated to send one or more additional DL LPP messages to UE 105.

At block 540, the UE 105 stores any assistance data if provided in the Downlink LPP message received from action 535 and performs any positioning measurements and location computation if requested by the Downlink LPP message.

At block 545, if the UE 105 is not using Control Plane CIoT EPS Optimization and if the UE 105 is in ECM-IDLE state, the UE instigates a UE triggered service request or, when User Plane CIoT EPS optimization applies, a Connection Resume procedure in order to establish a signaling connection with the network entity 504.

If the UE 105 is using Control Plane CIoT EPS Optimization, procedures for Mobile Originated Data Transport in Control Plane CIoT EPS optimization may be performed by the UE 105 at block 545 to establish a signaling connection with the network entity 504.

At action 550, the UE 105 returns any location information obtained in block 540 or may return any capabilities requested in the LPP message in action 535 to the network entity 504 via the base station 502 in an Uplink (UL) LPP message included in a NAS Transport message. The Uplink LPP message may alternatively carry a request for further assistance data. The UE 105 also includes the correlation ID in the NAS Transport Message that was received at action 535.

At action 555, the network entity 504 forwards the UL LPP message and the correlation ID to the location server 506 in a transport message. Actions 550 and 555 may be repeated if the UE 105 needs to send multiple UL LPP messages to respond to the request received in action 535. Some or all of actions and blocks 525-555 may be repeated one or more times as part of the location session between UE 105 and location server 506—e.g. to enable UE 105 to request and location server 506 to return assistance data to UE 105 or to allow location server 506 to request and UE 105 to return (e.g. additional) location measurements or a location estimate to location server 506. A final repetition of actions 525 and 535 (and possibly block 530) may be used by location server 506 to send a final DL LPP message to UE 105. The final DL LPP message may be as described for action 447 or action 452 in FIG. 4.

At action 560, the location server 506 provides a location response (e.g. carrying any location estimate for UE 105 determined by location server 506), with the correlation ID, to the network entity 504, which may then forward the location estimate for UE 105, if received at action 560, to the entity from which the location request was received at block 510 (not shown in FIG. 5).

The signaling flow for actions and blocks 510-560 may be repeated for a new location session, for which a new correlation ID is assigned by network entity 504 (different to the correlation ID used for actions 520, 525 535, 550, 555 and 560), as illustrated in blocks 570, 575, 590 and actions 580, 585 and 595 to send new assistance data, and to request further location information and further UE capabilities.

Figure 6:
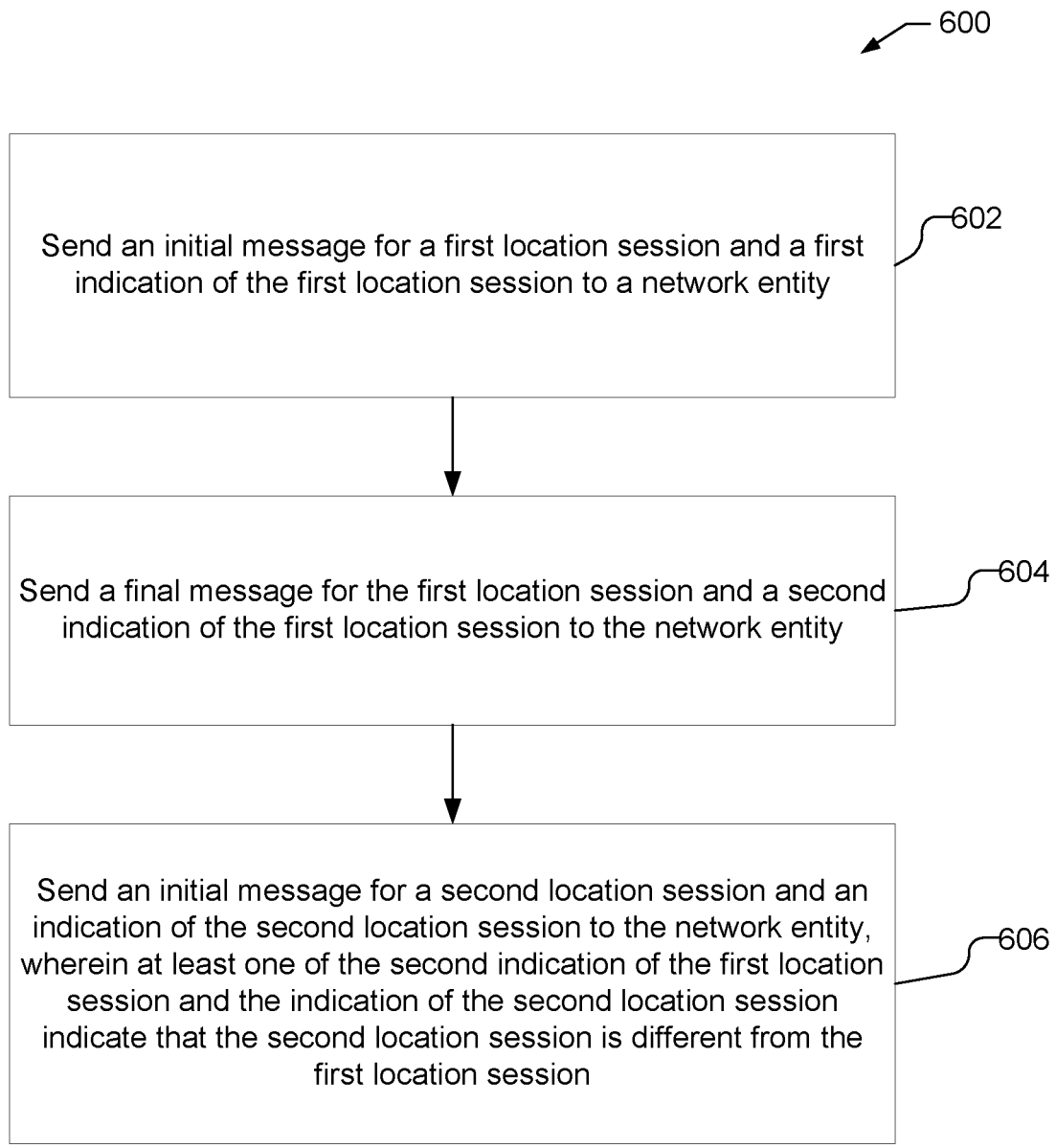
FIG. 6 shows a process flow illustrating a method for supporting location services for a user equipment (UE) performed by a location server in which enhancements to a positioning protocol are used to indicate when one location session is different from another location session.

FIG. 6 shows a process flow 600 illustrating a method for supporting location services for a user equipment (UE), such as the UE 105, performed by a location server, such as E-SMLC 132 or LMF 152, in which enhancements to a positioning protocol, such as LPP, or a NAS Transport protocol are used to indicate when one location session is different from another location session (or when one location session has started and/or ended). Process flow 600 may start at block 602, where an initial message for a first location session and a first indication of the first location session are sent to a network entity, such as MME 134 or AMF 154. For example, block 602 may be described at action 525 in FIG. 5 and may correspond to one of actions 420, 430 or 435 in FIG. 4. The network entity may send the initial message for the first location session and the first indication of the first location session to the UE, e.g. as described at action 535 in FIG. 5 and/or corresponding to one of actions 420, 430 or 435 in FIG. 4.

At block 604, a final message for the first location session and a second indication of the first location session are sent to the network entity, e.g. as described for a final repetition of action 525 in FIG. 5 and one of actions 447 and 452 in FIG. 4. The network entity may send the final message for the first location session and the second indication of the first location session to the UE, e.g. as described for a final repetition of action 535 in FIG. 5 and as at one of actions 447 and 452 in FIG. 4.

At block 606, an initial message for a second location session and an indication of the second location session are sent to the network entity, wherein at least one of the second indication of the first location session and the indication of the second location session indicate that the second location session is different from the first location session. For example, block 606 may correspond to action 585 in FIG. 5 and/or to action 465 in FIG. 4. The network entity may send the initial message for the second location session and the indication of the second location session to the UE, e.g. as for action 595 in FIG. 5 and/or corresponding to action 465 in FIG. 4. The initial message for the first location session, the final message for the first location session and the initial message for the second location session may each be an LPP message.

By way of example, the first indication of the first location session and the second indication of the first location session may be a first correlation identifier (ID) and the indication of the second location session may be a second correlation ID, wherein the second correlation ID is different from the first correlation ID, as described at block 515 and 575 and actions 520, 525, 580, and 585 in FIG. 5 and at blocks 415 and 460 and actions 420, 430, 435 and 465 in FIG. 4. The network entity, for example, may determine the first correlation ID and the second correlation ID. The process may further include the location server receiving a first location request for the UE from the network entity, the first location request comprising the first correlation ID, as described at block 415 and action 520 in FIGS. 4 and 5, and sending the initial message for the first location session in response to receiving the first location request, as described at actions 420, 430 or 435 and at action 525 in FIGS. 4 and 5. The process may further include the location server receiving a second location request for the UE from the network entity, the second location request comprising the second correlation ID, as described at block 460 and action 580 in FIGS. 4 and 5, and sending the initial message for the second location session in response to receiving the second location request, as described at actions 465 and 585 in FIGS. 4 and 5.

In one implementation, the location server may determine a first session identifier (ID), wherein the first indication of the first location session and the second indication of the first location session comprise the first session ID, wherein the initial message for the first location session and the final message for the first location session comprise the first session ID, as described for block 415 and actions 420, 447, and 452 in FIG. 4. The location server may determine a second session ID, wherein the second session ID is different from the first session ID, wherein the indication of the second location session comprises the second session ID, wherein the initial message for the second location sessions comprises the second session ID, as described for block 460 and action 465 in FIG. 4.

In one implementation, the first indication of the first location session may be an indication that the first location session is a new location session (or is the start of a new location session) as described for action 420 in FIG. 4. In this implementation, the indication of the second location session may comprise an indication that the second location session is a new location session (or the start of a new location session), as described for action 465 in FIG. 4.

In one implementation, the second indication of the first location session may be an indication of an end of the first location session, as described for actions 447 or 452 in FIG. 4. By way of example, the final message of the first location session may be an acknowledgment message (e.g. an LPP acknowledgment message), as described for action 447 in FIG. 4.

Figure 7:
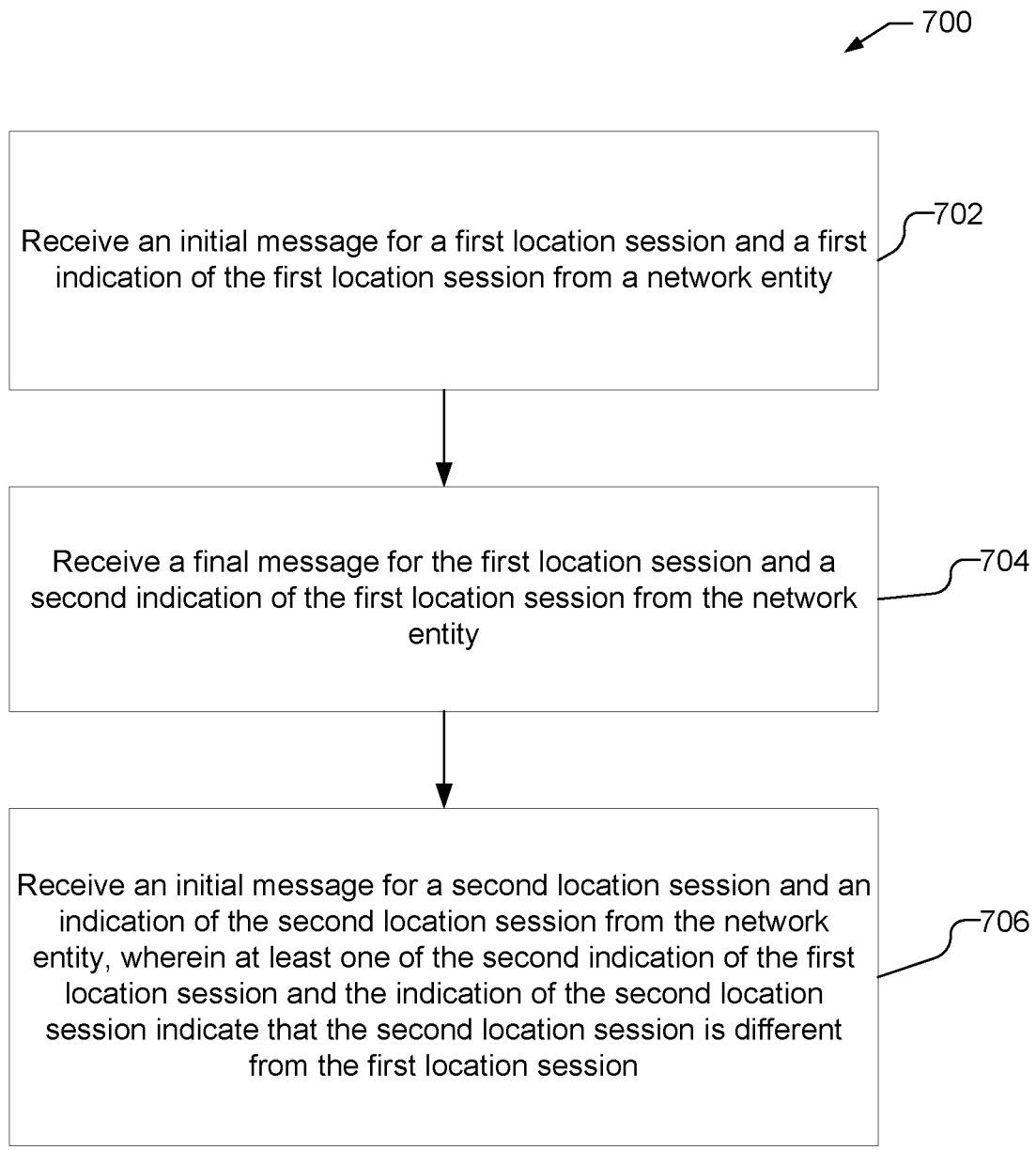
FIG. 7 shows a process flow illustrating a method for supporting location services for a user equipment (UE) performed by the UE in which enhancements to a positioning protocol are used to indicate when one location session is different from another location session.

FIG. 7 shows a process flow 700 illustrating a method for supporting location services for a user equipment (UE), such as the UE 105, performed by the UE, in which enhancements to a positioning protocol, such as LPP, or a NAS Transport protocol are used to indicate when one location session is different from another location session (or when one location session has started and/or ended). Process flow 700 may start at block 702, where an initial message for a first location session and a first indication of the first location session are received from a network entity, such as MME 134 or AMF 154. For example, block 702 may be as described for action 535 in FIG. 5 and may correspond to one of actions 420, 430 or 435 in FIG. 4. The network entity may receive the initial message for the first location session and the first indication of the first location session from a location server, such as E-SMLC 132 or LMF 152, e.g., as described for action 525 in FIG. 5 and/or corresponding to one of actions 420, 430 or 435 in FIG. 4.

At block 704, a final message for the first location session and a second indication of the first location session are received from the network entity, e.g. as described for a final repetition of action 535 in FIG. 5 and/or corresponding to one of actions 447 and 452 in FIG. 4. The network entity may receive the final message for the first location session and the second indication of the first location session from a location server (e.g. E-SMLC 132 or LMF 152), e.g. as described for a final repetition of action 525 in FIG. 5 and/or corresponding to one of actions 447 and 452 in FIG. 4.

At block 706, an initial message for a second location session and an indication of the second location session are received from the network entity, wherein at least one of the second indication of the first location session and the indication of the second location session indicate that the second location session is different from the first location session, e.g. as described for actions and blocks 575-595 in FIG. 5 and/or corresponding to action 465 in FIG. 4. The network entity may receive the initial message for the second location session and the indication of the second location session from the location server, e.g. corresponding to action 585 in FIG. 5 and/or action 465 in FIG. 4. The initial message for the first location session, the final message for the first location session and the initial message for the second location session may each be an LPP message a NAS Transport message containing an LPP message.

By way of example, the first indication of the first location session and the second indication of the first location session may comprise a first correlation identifier (ID), and the indication of the second location session may comprise a second correlation ID, wherein the second correlation ID is different from the first correlation ID, as described for blocks 515 and 575 and actions 520, 525, 580, and 585 in FIG. 5 and for blocks 415 and 460 and actions 420, 430 and 435 in FIG. 4. The network entity, for example, may determine the first correlation ID and the second correlation ID.

In one implementation, the first indication of the first location session and the second indication of the first location session may comprise a first session identifier (ID) determined by a location server, such as E-SMLC 132 or LMF 152, wherein the initial message for the first location session and the final message for the first location session comprise the first session ID, as described at block 415 and actions 420, 447, and 452 in FIG. 4. The indication of the second location session may comprise a second session ID determined by the location server, wherein the second session ID is different from the first session ID, wherein the initial message for the second location session comprises the second session ID, as described for block 460 and action 465 in FIG. 4.

In one implementation, the first indication of the first location session may be an indication that the first location session is a new location session (or the start of a new location session), and the indication of the second location session may comprise an indication that the second location session is a new location session (or the start of a new location session), as described for actions 420 and 465 in FIG. 4.

In one implementation, the second indication of the first location session comprises an indication of an end of the first location session, as described for actions 447 or 452 in FIG. 4. By way of example, the final message of the first location session may be an acknowledgment message (e.g. an LPP acknowledgment message), as described for action 447 in FIG. 4.

Figure 8:
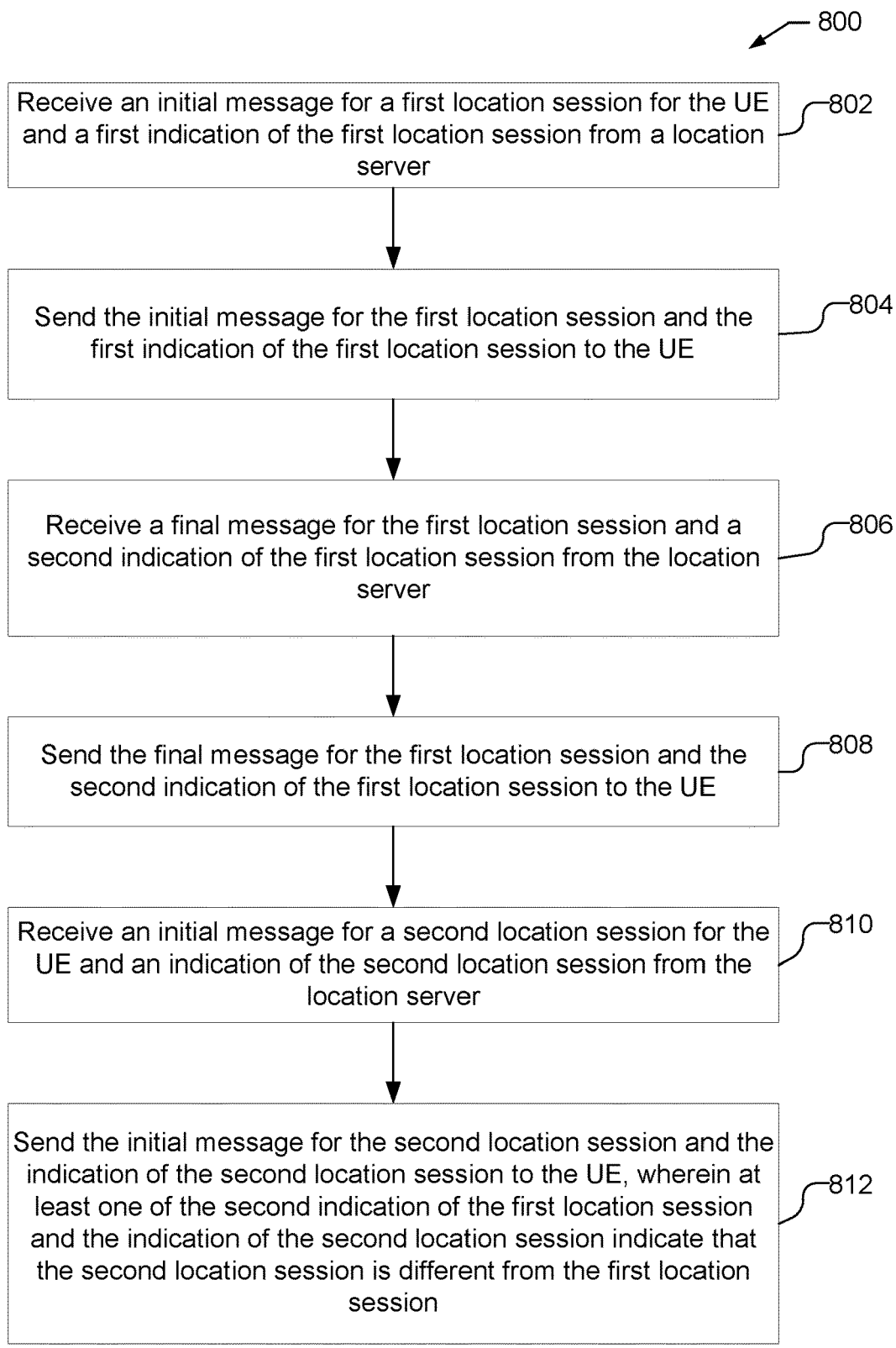
FIG. 8 shows a process flow illustrating a method for supporting location services for a user equipment (UE) performed by a network entity in which enhancements to a positioning protocol are used to indicate when one location session is different from another location session.

FIG. 8 shows a process flow 800 illustrating a method for supporting location services for a user equipment (UE), such as the UE 105, performed by a network entity, such as MME 134 or AMF 154, in which enhancements to a positioning protocol, such as LPP, or a NAS Transport protocol are used to indicate when one location session is different from another location session (or when one location session has started and/or ended). Process flow 800 may start at block 802, where an initial message for a first location session for the UE and a first indication of the first location session are received from a location server, such as E-SMLC 132 or LMF 152. For example, block 802 may be as described at action 525 in FIG. 5.

At block 804, the initial message for the first location session and the first indication of the first location session are sent to the UE, e.g. as described for action 535 in FIG. 5 and one of actions 420, 430 or 435 in FIG. 4.

At block 806, a final message for the first location session and a second indication of the first location session are received from the location server, e.g. as described for action 525 in FIG. 5 and/or one of actions 447 and 452 in FIG. 4.

At block 808, the final message for the first location session and the second indication of the first location session are sent to the UE, e.g. as described for action 535 in FIG. 5 and one of actions 447 and 452 in FIG. 4.

At block 810, an initial message for a second location session for the UE and an indication of the second location session are received from the location server, e.g. corresponding to action 585 in FIG. 5 and/or action 465 in FIG. 4.

At block 812, the initial message for the second location session and the indication of the second location session are sent to the UE, wherein at least one of the second indication of the first location session and the indication of the second location session indicate that the second location session is different from the first location session, e.g. corresponding to action 595 in FIG. 5 and/or action 465 in FIG. 4. The initial message for the first location session, the final message for the first location session and the initial message for the second location session may each be an LPP messages.

By way of example, the first indication of the first location session and the second indication of the first location session may comprise a first correlation identifier (ID), and the indication of the second location session may comprise a second correlation ID, wherein the second correlation ID is different from the first correlation ID, e.g. as described for blocks 515 and 575 and actions 520, 525, 580, and 585 in FIG. 5 and/or for blocks 415 and 460 and actions 420, 430, 435 and 465 in FIG. 4. The process may further include: receiving a first location service request for the UE from another entity (e.g. V-GMLC 116 or GMLC 155); determining the first correlation ID (e.g. as described at block 515 in FIG. 5); sending a first location request for the UE to the location server, where the first location request comprises the first correlation ID (e.g. as described for block 415 and action 520 in FIGS. 4 and 5); and receiving the initial message for the first location session and the first correlation ID from the location server in response to the first location request (e.g. as described for action 420 and action 525 in FIGS. 4 and 5). The process may further include: receiving a second location service request for the UE from another entity (e.g. V-GMLC 116 or GMLC 155) (e.g. as described for block 570 in FIG. 5); determining the second correlation ID (e.g. as described for action 575 in FIG. 5); sending a second location request for the UE to the location server, where the second location request comprises the second correlation ID (e.g. as described for block 460 and action 580 in FIGS. 4 and 5); and receiving the initial message for the second location session and the second correlation ID from the location server in response to the second location request (e.g. as described for action 585 in FIG. 5).

In one implementation, the first indication of the first location session and the second indication of the first location session may be a first session identifier (ID) determined by the location server, wherein the initial message for the first location session and the final message for the first location session comprise the first session ID, as described for block 415 and actions 420, 447, and 452 in FIG. 4. The indication of the second location session may be a second session ID determined by the location server, wherein the second session ID is different from the first session ID, wherein the initial message for the second location session comprises the second session ID, as described for block 460 and action 465 in FIG. 4.

In one implementation, the first indication of the first location session comprises an indication that the first location session is a new location session (or the start of a new location session), wherein the indication of the second location session comprises an indication that the second location session is a new location session (or the start of a new location session), as described for actions 420 and 465 in FIG. 4.

In one implementation, the second indication of the first location session comprises an indication of an end of the first location session, as described for action 447 or 452 in FIG. 4. By way of example, the final message of the first location session may be an acknowledgment message (e.g. an LPP acknowledgment message), as described for action 447 in FIG. 4.

Figure 9:
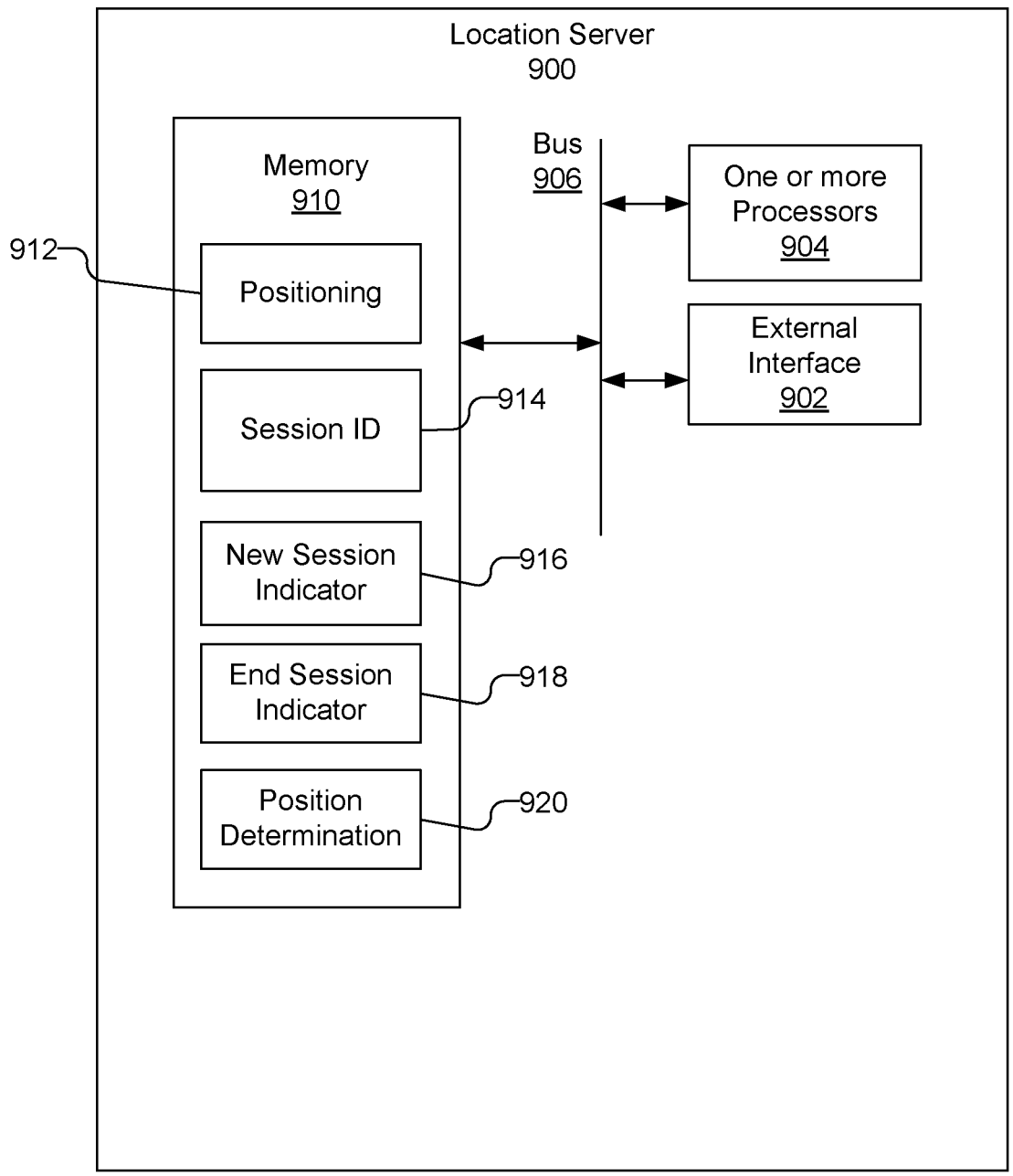
FIG. 9 is a block diagram of an embodiment of a location server capable of using enhancements to a positioning protocol to indicate when one location session is different from another location session.

FIG. 9 is a diagram illustrating an example of a hardware implementation of a location server 900, such as E-SMLC 132 shown in FIG. 1 or LMF 152 shown in FIGS. 2 and 3, that is capable of using enhancements to a positioning protocol to indicate when one location session is different from another location session. The location server 900 may be, e.g., part of a wireless network such as a EPC shown in FIG. 1, a 5G Core network (5GCN) shown in FIGS. 2 and 3, or an NG-RAN as shown in FIGS. 2 and 3. The location server 900 includes, e.g., hardware components such as an external interface 902, which may be a wired or wireless interface capable of connecting to a network entity, such as MME 134 or AMF 154. The external interface 902 may further be capable of connecting to other network entities, such as a GMLC, such as GMLC 155, VGMLC 155V or HGMLC 155H.

The location server 900 includes one or more processors 904 and memory 910, which may be coupled together with bus 906. The one or more processors 904 and other components of the location server 900 may similarly be coupled together with bus 906, a separate bus, or may be directly connected together or coupled using a combination of the foregoing. The memory 910 may store data and may contain executable code or software instructions that when executed by the one or more processors 904 cause the one or more processors 904 to operate as a special purpose computer programmed to perform the procedures and techniques disclosed herein (e.g. such as the process flow 600).

As illustrated in FIG. 9, the memory 910 includes one or more components or modules that when implemented by the one or more processors 904 implements the methodologies described herein. While the components or modules are illustrated as software in memory 910 that is executable by the one or more processors 904, it should be understood that the components or modules may be dedicated hardware or firmware either in the processors 904 or off processor. As illustrated, the memory 910 may include a positioning unit 912 that when implemented by the one or more processors 904 enables the one or more processors 904 to receive and send messages pursuant to a desired positioning protocol, such as LPP, as illustrated in the signal flows shown in FIGS. 4 and 5. The positioning unit 912, for example, may enable the one or more processors 904 receive location request messages, send initial messages and final messages for location sessions and to include correlation ID from a network entity and that are assigned to different location sessions for a UE.

The memory 910 may include a session ID unit 914 that when implemented by the one or more processors 904 enables the one or more processors 904 to generate a new session ID for each location session, wherein one or more of the messages sent pursuant to the positioning unit 912 may include the generated session IDs, e.g., as part of common IEs in the messages.

The memory 910 may include a new session indicator unit 916 that when implemented by the one or more processors 904 enables the one or more processors 904 to generate a new session indicator, such as a new session flag, indicating when a new location session is initiated and that is included in a first message in a new location session sent pursuant to the positioning unit 912.

The memory 910 may include an end session indicator unit 918 that when implemented by the one or more processors 904 enables the one or more processors 904 to generate an end session indicator, such as an end session flag, indicating when a location session is ending and that is included in a final message in a location session sent pursuant to the positioning unit 912.

The memory 910 may further include a position determination unit 920 that causes the one or more processors 904 to determine a location for the UE using, at least in part, the location information received. For example, the position determination unit 920 may cause the one or more processors 904 to determine an estimated location for the UE using the received location information by using one or more position methods, such as, for example, GNSS, Assisted GNSS (A-GNSS), Advanced Forward Link Trilateration (AFLT), Observed Time Difference Of Arrival (OTDOA), WLAN or Enhanced Cell ID (ECID) or combinations thereof.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 910) and executed by one or more processor units (e.g. processors 904), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 910, and are configured to cause the one or more processors (e.g. processors 904) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server (e.g. a location server 900) capable of supporting location services for a user equipment (UE), may include a means for sending an initial message for a first location session and a first indication of the first location session to a network entity, which may be, e.g., the external interface 902 and one or more processors 904 with dedicated hardware or implementing executable code or software instructions in memory 910 such as the positioning unit 912, as well as the session ID unit 914, and new session indicator unit 916. A means for sending a final message for the first location session and a second indication of the first location session to the network entity, which may be, e.g., the external interface 902 and one or more processors 904 with dedicated hardware or implementing executable code or software instructions in memory 910 such as the positioning unit 912, as well as the session ID unit 914, and end session indicator unit 918. A means for sending an initial message for a second location session and an indication of the second location session to the network entity, wherein at least one of the second indication of the first location session and the indication of the second location session indicate that the second location session is different from the first location session may be, e.g., the external interface 902 and one or more processors 904 with dedicated hardware or implementing executable code or software instructions in memory 910 such as the positioning unit 912, as well as the session ID unit 914, and new session indicator unit 916.

In one implementation, the first indication of the first location session and the second indication of the first location session may be a first correlation identifier (ID) and the indication of the second location session may be a second correlation ID, wherein the second correlation ID is different from the first correlation ID, where the network entity determines the first correlation ID and the second correlation ID. The location server, for example, may include a means for receiving a first location request for the UE from the network entity, the first location request comprising the first correlation ID, which may be, e.g., the external interface 902 and one or more processors 904 with dedicated hardware or implementing executable code or software instructions in memory 910 such as the positioning unit 912. A means for sending the initial message for the first location session in response to receiving the first location request may be, e.g., the external interface 902 and one or more processors 904 with dedicated hardware or implementing executable code or software instructions in memory 910 such as the positioning unit 912. A means for receiving a second location request for the UE from the network entity, the second location request comprising the second correlation ID may be, e.g., the external interface 902 and one or more processors 904 with dedicated hardware or implementing executable code or software instructions in memory 910 such as the positioning unit 912. A means for sending the initial message for the second location session in response to receiving the second location request, which may be the external interface 902 and one or more processors 904 with dedicated hardware or implementing executable code or software instructions in memory 910 such as the positioning unit 912.

In one implementation, the location server may include a means for determining a first session identifier (ID), wherein the first indication of the first location session and the second indication of the first location session comprise the first session ID, wherein the initial message for the first location session and the final message for the first location session comprise the first session ID, which may be, e.g., the one or more processors 904 with dedicated hardware or implementing executable code or software instructions in memory 910 such as the session ID unit 914. A means for determining a second session ID, wherein the second session ID is different from the first session ID, wherein the indication of the second location session comprises the second session ID, wherein the initial message for the second location sessions comprises the second session ID may be, e.g., the one or more processors 904 with dedicated hardware or implementing executable code or software instructions in memory 910 such as the session ID unit 914.

Figure 10:
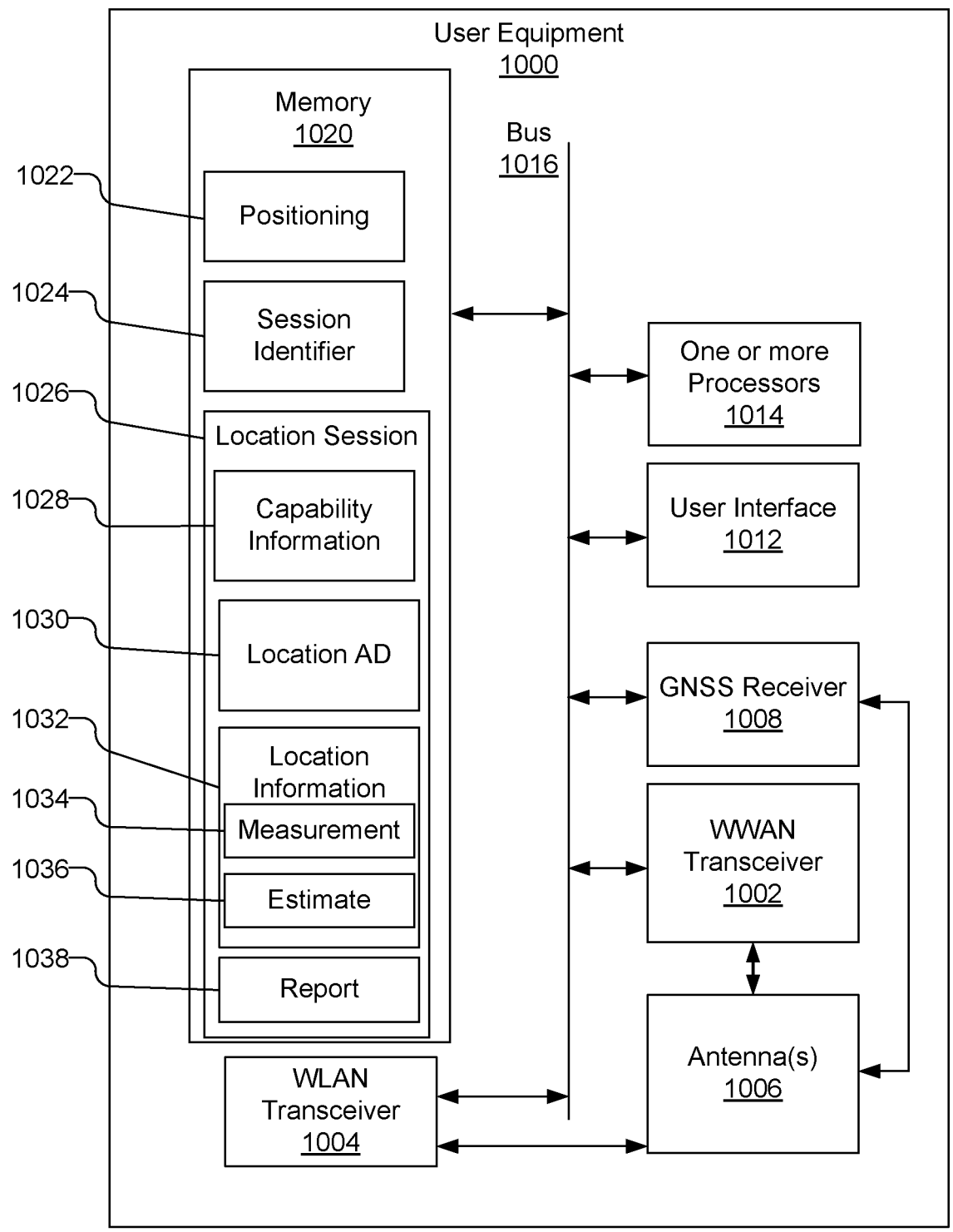
FIG. 10 is a block diagram of an embodiment of a UE capable of using enhancements to a positioning protocol to determine when one location session is different from another location session.

FIG. 10 is a diagram illustrating an example of a hardware implementation of an UE 1000, such as UE 105 illustrated in FIGS. 1-3, that is capable of using enhancements to a positioning protocol (e.g. LPP) or a NAS Transport protocol to determine when one location session is different from another location session. The UE 1000 may include a WWAN transceiver 1002 to wirelessly communicate with, e.g., base stations or cellular transceivers such as one or more evolved Node B (e.g. eNB 104), a next generation eNB (e.g. ng-eNB 114), a New Radio (NR) Node B (e.g. a gNB 110). The UE 1000 may also include a WLAN transceiver 1004 to wirelessly communicate with local transceivers (e.g. WiFi APs or Bluetooth beacons). The UE 1000 may include one or more antennas 1006 that may be used with the WWAN transceiver 1002 and WLAN transceiver 1004. The UE 1000 may further include a GNSS receiver 1008 for receiving and measuring signals from GNSS SVs 190 (shown in FIGS. 1-3). The UE 1000 may further include a user interface 1012 that may include e.g., a display, a keypad or other input device, such as virtual keypad on the display, through which a user may interface with the UE 1000.

The UE 1000 further includes one or more processors 1014 and memory 1020, which may be coupled together with bus 1016. The one or more processors 1014 and other components of the UE 1000 may similarly be coupled together with bus 1016, a separate bus, or may be directly connected together or coupled using a combination of the foregoing. The memory 1020 may store data and may contain executable code or software instructions that when executed by the one or more processors 1014 cause the one or more processors 1014 to operate as a special purpose computer programmed to perform the techniques disclosed herein. As illustrated in FIG. 10, the memory 1020 may include one or more components or modules that may be implemented by the one or more processors 1014 to perform the methodologies described herein. While the components or modules are illustrated as software in memory 1020 that is executable by the one or more processors 1014, it should be understood that the components or modules may be dedicated hardware or firmware either in the one or more processors 1014 or off the processors.

A number of software modules and data tables may reside in the memory 1020 and be utilized by the one or more processors 1014 in order to manage both communications and the functionality described herein. It should be appreciated that the organization of the contents of the memory 1020 as shown in FIG. 10 is merely exemplary, and as such the functionality of the modules and/or data structures may be combined, separated, and/or be structured in different ways depending upon the implementation of the UE 1000.

As illustrated, the memory 1020 may include a positioning unit 1022 that when implemented by the one or more processors 1014 enables the one or more processors 1014 to receive and send messages pursuant to a desired positioning protocol, such as LPP, as illustrated in the signal flows shown in FIGS. 4 and 5.

The memory 1020 may include a session identifier unit 1024 that when implemented by the one or more processors 1014 enables the one or more processors 1014 to determine to which location session a received message pertains, e.g., based on a correlation ID, session ID, a new session indicator or end session indicator present in one or more messages received from a location server (e.g. E-SMLC 132 or LMF 152).

The memory 1020 may further include a location session module 1026 that when implemented by the one or more processors 1014 configures the one or more processors 1014 to engage in a location session with a location server as discussed herein, e.g., in signaling flows 400 and 500. For example, the location session module 1026 may include a capability information module 1028 that stores the capabilities of the UE 1000, and when implemented by the one or more processors 1014 configures the one or more processors 1014 to transmit via the WWAN transceiver 1002 the capability information to a location server, which may be transmitted, e.g., in response to receiving a request for capability information from the location server. The location session module 1026 in the memory 1020 may further include a location assistance data module 1030 that when implemented by the one or more processors 1014 configures the one or more processors 1014 to receive location assistance data from the location server. The location session module 1026 in the memory 1020 may further include a location information module 1032 that when implemented by the one or more processors 1014 configures the one or more processors 1014 to obtain, e.g., via one or more of the WWAN transceiver 1002, the WLAN transceiver 1004, and the GNSS receiver 1008, at least some location information. For example, the location information module 1032 may include a measurement module 1034 that when implemented by the one or more processors 1014 configures the one or more processors 1014 to obtain location measurements, such as may include measurements of RSTD obtained by measuring PRS or other reference signals (e.g. CRS signals) received by WWAN transceiver 1002 and/or WLAN transceiver 1004, measurements of RTT obtained by measuring signals received/transmitted by WWAN transceiver 1002 and/or WLAN transceiver 1004, and/or measurements of GNSS pseudorange, code phase or carrier phase obtained by measuring one or more navigation signals received by GNSS receiver 1008. The location information module 1032 may include an estimate module 1036 that when implemented by the one or more processors 1014 configures the one or more processors 1014 to determine a location estimate for the UE 1000, e.g., using the measurements obtained using measurement module 1034. The location session module 1026 may further include a report module 1038 that transmits, e.g., via the WWAN transceiver 1002, at least some of the location information to the location server.

The methodologies described herein may be implemented by various means depending upon the application. For example, these methodologies may be implemented in hardware, firmware, software, or any combination thereof. For a hardware implementation, the one or more processors 1014 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1000 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1020) and executed by one or more processors 1014, causing the one or more processors 1014 to operate as a special purpose computer programmed to perform the techniques disclosed herein. Memory may be implemented within the one or processors 1014 or external to the one or more processors 1014. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1000 may be stored as one or more instructions or code on a non-transitory computer-readable storage medium such as memory 1020. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1000 may be provided as signals on transmission media included in a communication apparatus. For example, a communication apparatus comprising part or all of UE 1000 may include a transceiver having signals indicative of instructions and data. The instructions and data are stored on non-transitory computer readable media, e.g., memory 1020, and are configured to cause the one or more processors 1014 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment, such as UE 1000, may include a means for receiving an initial message for a first location session and a first indication of the first location session from a network entity, which may be, e.g., the WWAN transceiver 1002 and one or more processors 1014 with dedicated hardware or implementing executable code or software instructions in memory 1020 such as the positioning unit 1022 and session identifier unit 1024. A means for receiving a final message for the first location session and a second indication of the first location session from the network entity, which may be, e.g., the WWAN transceiver 1002 and one or more processors 1014 with dedicated hardware or implementing executable code or software instructions in memory 1020 such as the positioning unit 1022 and session identifier unit 1024. A means for receiving an initial message for a second location session and an indication of the second location session from the network entity, wherein at least one of the second indication of the first location session and the indication of the second location session indicate that the second location session is different from the first location session may be, e.g., the WWAN transceiver 1002 and one or more processors 1014 with dedicated hardware or implementing executable code or software instructions in memory 1020 such as the positioning unit 1022 and session identifier unit 1024.

Figure 11:
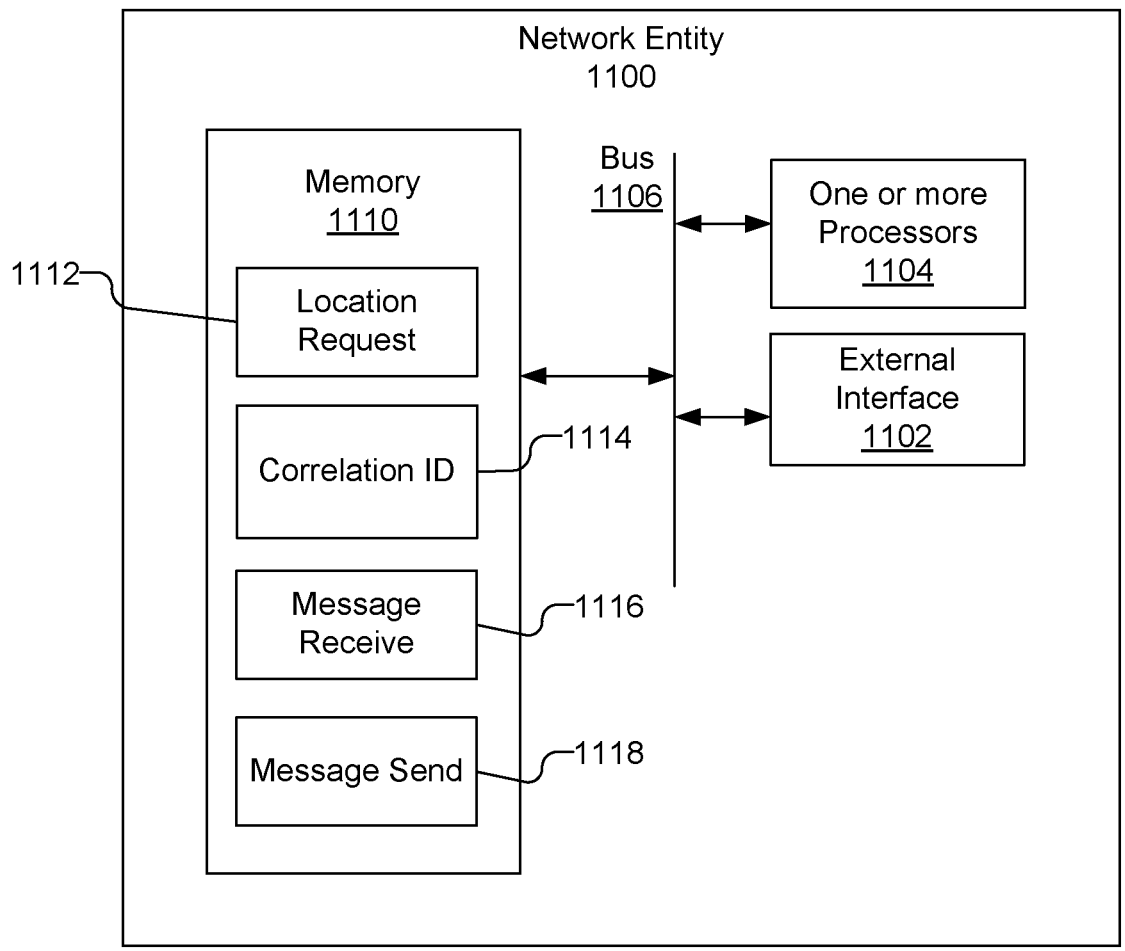
FIG. 11 is a block diagram of an embodiment of a network entity capable of using enhancements to a positioning protocol to indicate when one location session is different from another location session.

FIG. 11 is a diagram illustrating an example of a hardware implementation of a network entity 1100, such as MME 134 shown in FIG. 1, or AMF 154 shown in FIGS. 2 and 3, that is capable of using enhancements to a positioning protocol (e.g. LPP) or a NAS transport protocol to indicate when one location session is different from another location session. The network entity 1100 includes, e.g., hardware components such as an external interface 1102, which may be a wired or wireless interface capable of connecting to a location server, such as E-SMLC 132 or LMF 152 shown in FIGS. 1-3, to an external client 150 via a GMLC (e.g. a GMLC 155, V-GMLC 116 or H-GMLC 148), and to a UE 105, via base stations or cellular transceivers such as one or more evolved Node Bs (e.g. eNB 104), a next generation eNB (e.g. ng-eNB 114), a New Radio (NR) Node B (e.g. a gNB 110).

The network entity 1100 further includes one or more processors 1104 and memory 1110, which may be coupled together with bus 1106. The one or more processors 1104 and other components of the network entity 1100 may similarly be coupled together with bus 1106, a separate bus, or may be directly connected together or coupled using a combination of the foregoing. The memory 1110 may store data and may contain executable code or software instructions that when executed by the one or more processors 1104 cause the one or more processors 1104 to operate as a special purpose computer programmed to perform the procedures and techniques disclosed herein. As illustrated in FIG. 11, the memory 1110 includes one or more components or modules that when implemented by the one or more processors 1104 implements the methodologies as described herein. While the components or modules are illustrated as software in memory 1110 that is executable by the one or more processors 1104, it should be understood that the components or modules may be dedicated hardware or firmware either in the processor or off processor.

As illustrated, the memory 1110 may include a location request unit 1112, that when implemented by the one or more processors 1104 enables the one or more processors 1104 to receive a location request, e.g., from an external client, via the external interface 1102. A correlation ID unit 1114 when implemented by the one or more processors 1104 may enable the one or more processors 1104 to allocate a correlation ID to identify the location session associated with a received location request, and may also identify the location server, e.g., E-SMLC 132 or LMF 152, to be used with the location session.

A message receive unit 1116 and a message send unit 1118 when implemented by the one or more processors 1104 enables the one or more processors 1104 to receive messages and send messages, respectively, via the external interface 1102, from and to a location server and a UE, during a positioning session using a desired positioning protocol, such as LPP, as illustrated in the signal flows shown in FIGS. 4 and 5.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of network entity 1100 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g., memory 1110) and executed by one or more processors 1104, causing the one or more processors 1104 to operate as a special purpose computer programmed to perform the algorithms disclosed herein. Memory may be implemented within the one or more processors 1104 or external to the one or more processors 1104. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by the network entity 1100 may be stored as one or more instructions or code on a non-transitory computer-readable storage medium such as memory 1110. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus comprising part or all of the network entity 1100 may include a transceiver having signals indicative of instructions and data. The instructions and data are stored on non-transitory computer readable media, e.g., memory 1110, and are configured to cause the one or more processors 1104 to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a network entity, such as network entity 1100, may include a means for receiving an initial message for a first location session for a UE (e.g. UE 105) and a first indication of the first location session from a location server (e.g. E-SMLC 132 or LMF 152), which may be, e.g., the external interface 1102 and one or more processors 1104 with dedicated hardware or implementing executable code or software instructions in memory 1110 such as the message receive unit 1116. A means for sending the initial message for the first location session and the first indication of the first location session to the UE may be, e.g., the external interface 1102 and one or more processors 1104 with dedicated hardware or implementing executable code or software instructions in memory 1110 such as the message send unit 1118. A means for receiving a final message for the first location session and a second indication of the first location session from the location server may be, e.g., the external interface 1102 and one or more processors 1104 with dedicated hardware or implementing executable code or software instructions in memory 1110 such as the message receive unit 1116. A means for sending the final message for the first location session and the second indication of the first location session to the UE may be, e.g., the external interface 1102 and one or more processors 1104 with dedicated hardware or implementing executable code or software instructions in memory 1110 such as the message send unit 1118. A means for receiving an initial message for a second location session for the UE and an indication of the second location session from the location server may be, e.g., the external interface 1102 and one or more processors 1104 with dedicated hardware or implementing executable code or software instructions in memory 1110 such as the message receive unit 1116. A means for sending the initial message for the second location session and the indication of the second location session to the UE, wherein at least one of the second indication of the first location session and the indication of the second location session indicate that the second location session is different from the first location session may be, e.g., the external interface 1102 and one or more processors 1104 with dedicated hardware or implementing executable code or software instructions in memory 1110 such as the message send unit 1118.

In one implementation, the first indication of the first location session and the second indication of the first location session comprise a first correlation identifier (ID) and the indication of the second location session comprises a second correlation ID, wherein the second correlation ID is different from the first correlation ID. The network entity may include a means for determining the first correlation ID, which may be, e.g., the one or more processors 1104 with dedicated hardware or implementing executable code or software instructions in memory 1110 such as the correlation ID unit 1114. A means for sending a first location request for the UE to the location server, the first location request comprising the first correlation ID may be, e.g., the external interface 1102 and one or more processors 1104 with dedicated hardware or implementing executable code or software instructions in memory 1110 such as the message send unit 1118. A means for receiving the initial message for the first location session and the first correlation ID from the location server in response to the first location request may be, e.g., the external interface 1102 and one or more processors 1104 with dedicated hardware or implementing executable code or software instructions in memory 1110 such as the message receive unit 1116. The network entity may further include a means for determining the second correlation ID which may be, e.g., the one or more processors 1104 with dedicated hardware or implementing executable code or software instructions in memory 1110 such as the correlation ID unit 1114. A means for sending a second location request for the UE to the location server, the second location request comprising the second correlation ID may be, e.g., the external interface 1102 and one or more processors 1104 with dedicated hardware or implementing executable code or software instructions in memory 1110 such as the message send unit 1118. A means for receiving the initial message for the second location session and the second correlation ID from the location server in response to the second location request may be, e.g., the external interface 1102 and one or more processors 1104 with dedicated hardware or implementing executable code or software instructions in memory 1110 such as the message receive unit 1116.

One implementation (1) may be a method for supporting location services for a user equipment (UE) performed by the UE, the method comprising: receiving an initial message for a first location session and a first indication of the first location session from a network entity; receiving a final message for the first location session and a second indication of the first location session from the network entity; and receiving an initial message for a second location session and an indication of the second location session from the network entity, wherein at least one of the second indication of the first location session and the indication of the second location session indicate that the second location session is different from the first location session.

There may be some implementations (2) of the above-described method (1) wherein the first indication of the first location session and the second indication of the first location session comprise a first correlation identifier (ID) and the indication of the second location session comprises a second correlation ID, wherein the second correlation ID is different from the first correlation ID.

There may be some implementations (3) of the above-described method (2) wherein the network entity determines the first correlation ID and the second correlation ID.

There may be some implementations (4) of the above-described method (1) wherein: the first indication of the first location session and the second indication of the first location session comprise a first session identifier (ID) determined by a location server, wherein the initial message for the first location session and the final message for the first location session comprise the first session ID; and the indication of the second location session comprises a second session ID determined by the location server, wherein the second session ID is different from the first session ID, wherein the initial message for the second location session comprises the second session ID.

There may be some implementations (5) of the above-described method (1) wherein the first indication of the first location session comprises an indication that the first location session is a new location session, wherein the indication of the second location session comprises an indication that the second location session is a new location session.

There may be some implementations (6) of the above-described method (1) wherein the second indication of the first location session comprises an indication of an end of the first location session.

There may be some implementations (7) of the above-described method (6) wherein the final message of the first location session is an acknowledgment message.

There may be some implementations (8) of the above-described method (4) wherein the location server is an Enhanced Serving Mobile Location Center (E-SMLC) and the network entity is a Mobility Management Entity (MME).

There may be some implementations (9) of the above-described method (4) wherein the location server is a Location Management Function (LMF) and the network entity is an Access and Mobility Management Function (AMF).

There may be some implementations (10) of the above-described method (1) wherein the initial message for the first location session, the final message for the first location session and the initial message for the second location session are each a Long Term Evolution (LTE) Positioning Protocol (LPP) message or a Non-Access Stratum (NAS) Transport message containing an LPP message.

One implementation (11) may be a user equipment (UE) for supporting location services for the UE, the UE comprising: at least one wireless transceiver configured to wirelessly communicate with at least one wireless network; memory configured to store instructions; and at least one processor coupled to the at least one wireless transceiver and the memory, the at least one processor configured by the instructions stored in the memory to: receive via the at least one wireless transceiver an initial message for a first location session and a first indication of the first location session from a network entity; receive via the at least one wireless transceiver a final message for the first location session and a second indication of the first location session from the network entity; and receive via the at least one wireless transceiver an initial message for a second location session and an indication of the second location session from the network entity, wherein at least one of the second indication of the first location session and the indication of the second location session indicate that the second location session is different from the first location session.

There may be some implementations (12) of the above-described UE (11) wherein the first indication of the first location session and the second indication of the first location session comprise a first correlation identifier (ID) and the indication of the second location session comprises a second correlation ID, wherein the second correlation ID is different from the first correlation ID.

There may be some implementations (13) of the above-described UE (12) wherein the network entity determines the first correlation ID and the second correlation ID.

There may be some implementations (14) of the above-described UE (11) wherein: the first indication of the first location session and the second indication of the first location session comprise a first session identifier (ID) determined by a location server, wherein the initial message for the first location session and the final message for the first location session comprise the first session ID; and the indication of the second location session comprises a second session ID determined by the location server, wherein the second session ID is different from the first session ID, wherein the initial message for the second location session comprises the second session ID.

There may be some implementations (15) of the above-described UE (11) wherein the first indication of the first location session comprises an indication that the first location session is a new location session, wherein the indication of the second location session comprises an indication that the second location session is a new location session.

There may be some implementations (16) of the above-described UE (11) wherein the second indication of the first location session comprises an indication of an end of the first location session.

There may be some implementations (17) of the above-described UE (16) wherein the final message of the first location session is an acknowledgment message.

There may be some implementations (18) of the above-described UE (14) wherein the location server is an Enhanced Serving Mobile Location Center (E-SMLC) and the network entity is a Mobility Management Entity (MME).

There may be some implementations (19) of the above-described UE (14) wherein the location server is a Location Management Function (LMF) and the network entity is an Access and Mobility Management Function (AMF).

There may be some implementations (20) of the above-described UE (11) wherein the initial message for the first location session, the final message for the first location session and the initial message for the second location session are each a Long Term Evolution (LTE) Positioning Protocol (LPP) message or a Non-Access Stratum (NAS) Transport message containing an LPP message.

One implementation (21) may be a user equipment (UE) for supporting location services for the UE, the UE comprising: means for receiving an initial message for a first location session and a first indication of the first location session from a network entity; means for receiving a final message for the first location session and a second indication of the first location session from the network entity; and means for receiving an initial message for a second location session and an indication of the second location session from the network entity, wherein at least one of the second indication of the first location session and the indication of the second location session indicate that the second location session is different from the first location session.

There may be some implementations (22) of the above-described UE (21) wherein the first indication of the first location session and the second indication of the first location session comprise a first correlation identifier (ID) and the indication of the second location session comprises a second correlation ID, wherein the second correlation ID is different from the first correlation ID.

There may be some implementations (23) of the above-described UE (22) wherein the network entity determines the first correlation ID and the second correlation ID.

There may be some implementations (24) of the above-described UE (21) wherein: the first indication of the first location session and the second indication of the first location session comprise a first session identifier (ID) determined by a location server, wherein the initial message for the first location session and the final message for the first location session comprise the first session ID; and the indication of the second location session comprises a second session ID determined by the location server, wherein the second session ID is different from the first session ID, wherein the initial message for the second location session comprises the second session ID.

One implementation (25) may be a non-transitory storage medium including program code stored thereon, the program code is operable to configure at least one processor in a user equipment (UE) for supporting location services for the UE, comprising: program code to receive an initial message for a first location session and a first indication of the first location session from a network entity; program code to receive a final message for the first location session and a second indication of the first location session from the network entity; and program code to receive an initial message for a second location session and an indication of the second location session from the network entity, wherein at least one of the second indication of the first location session and the indication of the second location session indicate that the second location session is different from the first location session.

There may be some implementations (26) of the above-described non-transitory storage medium (25) wherein the first indication of the first location session and the second indication of the first location session comprise a first correlation identifier (ID) and the indication of the second location session comprises a second correlation ID, wherein the second correlation ID is different from the first correlation ID.

There may be some implementations (27) of the above-described non-transitory storage medium (26) wherein the network entity determines the first correlation ID and the second correlation ID.

There may be some implementations (28) of the above-described non-transitory storage medium (25) wherein: the first indication of the first location session and the second indication of the first location session comprise a first session identifier (ID) determined by a location server, wherein the initial message for the first location session and the final message for the first location session comprise the first session ID; and the indication of the second location session comprises a second session ID determined by the location server, wherein the second session ID is different from the first session ID, wherein the initial message for the second location session comprises the second session ID.

One implementation (29) may be a method for supporting location services for a user equipment (UE) performed by a network entity, the method comprising: receiving an initial message for a first location session for the UE and a first indication of the first location session from a location server; sending the initial message for the first location session and the first indication of the first location session to the UE; receiving a final message for the first location session and a second indication of the first location session from the location server; sending the final message for the first location session and the second indication of the first location session to the UE; receiving an initial message for a second location session for the UE and an indication of the second location session from the location server; and sending the initial message for the second location session and the indication of the second location session to the UE, wherein at least one of the second indication of the first location session and the indication of the second location session indicate that the second location session is different from the first location session.

There may be some implementations (30) of the above-described method (29) wherein the first indication of the first location session and the second indication of the first location session comprise a first correlation identifier (ID) and the indication of the second location session comprises a second correlation ID, wherein the second correlation ID is different from the first correlation ID.

There may be some implementations (31) of the above-described method (30) further comprising: determining the first correlation ID; sending a first location request for the UE to the location server, the first location request comprising the first correlation ID; receiving the initial message for the first location session and the first correlation ID from the location server in response to the first location request; determining the second correlation ID; sending a second location request for the UE to the location server, the second location request comprising the second correlation ID; and receiving the initial message for the second location session and the second correlation ID from the location server in response to the second location request.

There may be some implementations (32) of the above-described method (29) wherein: the first indication of the first location session and the second indication of the first location session comprise a first session identifier (ID) determined by the location server, wherein the initial message for the first location session and the final message for the first location session comprise the first session ID; and the indication of the second location session comprises a second session ID determined by the location server, wherein the second session ID is different from the first session ID, wherein the initial message for the second location session comprises the second session ID.

There may be some implementations (33) of the above-described method (29) wherein the first indication of the first location session comprises an indication that the first location session is a new location session, wherein the indication of the second location session comprises an indication that the second location session is a new location session.

There may be some implementations (34) of the above-described method (29) wherein the second indication of the first location session comprises an indication of an end of the first location session.

There may be some implementations (35) of the above-described method (34) wherein the final message of the first location session is an acknowledgment message.

There may be some implementations (36) of the above-described method (29) wherein the location server is an Enhanced Serving Mobile Location Center (E-SMLC) and the network entity is a Mobility Management Entity (MME).

There may be some implementations (37) of the above-described method (29) wherein the location server is a Location Management Function (LMF) and the network entity is an Access and Mobility Management Function (AMF).

There may be some implementations (38) of the above-described method (29) wherein the initial message for the first location session, the final message for the first location session and the initial message for the second location session are each a Long Term Evolution (LTE) Positioning Protocol (LPP) message.

One implementation (39) may be a network entity for supporting location services for a user equipment (UE) performed by the network entity, the network entity comprising: an external interface configured to communicate with a wireless network; memory configured to store instructions; and at least one processor coupled to the external interface and the memory, the at least one processor configured by the instructions stored in the memory to: receive via the external interface an initial message for a first location session for the UE and a first indication of the first location session from a location server; send via the external interface the initial message for the first location session and the first indication of the first location session to the UE; receive via the external interface a final message for the first location session and a second indication of the first location session from the location server; send via the external interface the final message for the first location session and the second indication of the first location session to the UE; receive via the external interface an initial message for a second location session for the UE and an indication of the second location session from the location server; and send via the external interface the initial message for the second location session and the indication of the second location session to the UE, wherein at least one of the second indication of the first location session and the indication of the second location session indicate that the second location session is different from the first location session.

There may be some implementations (40) of the above-described network entity (39) wherein the first indication of the first location session and the second indication of the first location session comprise a first correlation identifier (ID) and the indication of the second location session comprises a second correlation ID, wherein the second correlation ID is different from the first correlation ID.

There may be some implementations (41) of the above-described network entity (40) wherein the at least one processor is further configured to: determine the first correlation ID; send via the external interface a first location request for the UE to the location server, the first location request comprising the first correlation ID; receive via the external interface the initial message for the first location session and the first correlation ID from the location server in response to the first location request; determine the second correlation ID; send via the external interface a second location request for the UE to the location server, the second location request comprising the second correlation ID; and receive via the external interface the initial message for the second location session and the second correlation ID from the location server in response to the second location request.

There may be some implementations (42) of the above-described network entity (39) wherein: the first indication of the first location session and the second indication of the first location session comprise a first session identifier (ID) determined by the location server, wherein the initial message for the first location session and the final message for the first location session comprise the first session ID; and the indication of the second location session comprises a second session ID determined by the location server, wherein the second session ID is different from the first session ID, wherein the initial message for the second location session comprises the second session ID.

There may be some implementations (43) of the above-described network entity (39) wherein the first indication of the first location session comprises an indication that the first location session is a new location session, wherein the indication of the second location session comprises an indication that the second location session is a new location session.

There may be some implementations (44) of the above-described network entity (39) wherein the second indication of the first location session comprises an indication of an end of the first location session.

There may be some implementations (45) of the above-described network entity (44) wherein the final message of the first location session is an acknowledgment message.

There may be some implementations (46) of the above-described network entity (39) wherein the location server is an Enhanced Serving Mobile Location Center (E-SMLC) and the network entity is a Mobility Management Entity (MME).

There may be some implementations (47) of the above-described network entity (39) wherein the location server is a Location Management Function (LMF) and the network entity is an Access and Mobility Management Function (AMF).

There may be some implementations (48) of the above-described network entity (39) wherein the initial message for the first location session, the final message for the first location session and the initial message for the second location session are each a Long Term Evolution (LTE) Positioning Protocol (LPP) message.

One implementation (49) may be a network entity for supporting location services for a user equipment (UE) performed by the network entity, the network entity comprising: means for receiving an initial message for a first location session for the UE and a first indication of the first location session from a location server; means for sending the initial message for the first location session and the first indication of the first location session to the UE; means for receiving a final message for the first location session and a second indication of the first location session from the location server; means for sending the final message for the first location session and the second indication of the first location session to the UE; means for receiving an initial message for a second location session for the UE and an indication of the second location session from the location server; and means for sending the initial message for the second location session and the indication of the second location session to the UE, wherein at least one of the second indication of the first location session and the indication of the second location session indicate that the second location session is different from the first location session.

There may be some implementations (50) of the above-described network entity (49) wherein the first indication of the first location session and the second indication of the first location session comprise a first correlation identifier (ID) and the indication of the second location session comprises a second correlation ID, wherein the second correlation ID is different from the first correlation ID.

There may be some implementations (51) of the above-described network entity (50) further comprising: means for determining the first correlation ID; means for sending a first location request for the UE to the location server, the first location request comprising the first correlation ID; means for receiving the initial message for the first location session and the first correlation ID from the location server in response to the first location request; means for determining the second correlation ID; means for sending a second location request for the UE to the location server, the second location request comprising the second correlation ID; and means for receiving the initial message for the second location session and the second correlation ID from the location server in response to the second location request.

There may be some implementations (52) of the above-described network entity (49) wherein: the first indication of the first location session and the second indication of the first location session comprise a first session identifier (ID) determined by the location server, wherein the initial message for the first location session and the final message for the first location session comprise the first session ID; and the indication of the second location session comprises a second session ID determined by the location server, wherein the second session ID is different from the first session ID, wherein the initial message for the second location session comprises the second session ID.

There may be some implementations (53) of the above-described network entity (49) wherein the first indication of the first location session comprises an indication that the first location session is a new location session, wherein the indication of the second location session comprises an indication that the second location session is a new location session.

One implementation (54) may be a non-transitory storage medium including program code stored thereon, the program code is operable to configure at least one processor in a network entity for supporting location services for a user equipment (UE), comprising: program code to receive an initial message for a first location session for the UE and a first indication of the first location session from a location server; program code to send the initial message for the first location session and the first indication of the first location session to the UE; program code to receive a final message for the first location session and a second indication of the first location session from the location server; program code to send the final message for the first location session and the second indication of the first location session to the UE; program code to receive an initial message for a second location session for the UE and an indication of the second location session from the location server; and program code to send the initial message for the second location session and the indication of the second location session to the UE, wherein at least one of the second indication of the first location session and the indication of the second location session indicate that the second location session is different from the first location session.

There may be some implementations (55) of the above-described non-transitory storage medium (54) wherein the first indication of the first location session and the second indication of the first location session comprise a first correlation identifier (ID) and the indication of the second location session comprises a second correlation ID, wherein the second correlation ID is different from the first correlation ID.

There may be some implementations (56) of the above-described non-transitory storage medium (50) further comprising: program code to determine the first correlation ID; program code to send a first location request for the UE to the location server, the first location request comprising the first correlation ID; program code to receive the initial message for the first location session and the first correlation ID from the location server in response to the first location request; program code to determine the second correlation ID; program code to send a second location request for the UE to the location server, the second location request comprising the second correlation ID; and program code to receive the initial message for the second location session and the second correlation ID from the location server in response to the second location request.

There may be some implementations (57) of the above-described non-transitory storage medium (54) wherein: the first indication of the first location session and the second indication of the first location session comprise a first session identifier (ID) determined by the location server, wherein the initial message for the first location session and the final message for the first location session comprise the first session ID; and the indication of the second location session comprises a second session ID determined by the location server, wherein the second session ID is different from the first session ID, wherein the initial message for the second location session comprises the second session ID.

There may be some implementations (58) of the above-described non-transitory storage medium (54) wherein the first indication of the first location session comprises an indication that the first location session is a new location session, wherein the indication of the second location session comprises an indication that the second location session is a new location session.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for supporting location services for a user equipment (UE) performed by a location server, the method comprising:

sending, in response to receiving a first location request for the UE, an initial message for a first location session and an indication of the first location session to a network entity;

sending an end message indicating an end of the first location session to the network entity;

after sending the end message, completing the first location session by calculating a location of the UE corresponding to the first location request; and sending, in response to receiving a second location request for the UE, an initial message for a second location session and an indication of the second location session to the network entity after sending the end message for the first location session, wherein the second location session is initiated after the first location session ends and the first location session and the second location session are non-concurrent location sessions, wherein at least one of the end message of the first location session and the indication of the second location session indicates that the second location session is different from the first location session, wherein the indication that the second location session is different from the first location session enables the UE to treat the non-concurrent location sessions as different location sessions.

2. The method of claim 1, wherein the indication of the first location session and the end message of the first location session comprise a first correlation identifier (ID) and the indication of the second location session comprises a second correlation ID, wherein the second correlation ID is different from the first correlation ID.

3. The method of claim 2, wherein the network entity determines the first correlation ID and the second correlation ID.

4. The method of claim 3 further comprising:
receiving the first location request for the UE from the network entity, the first location request comprising the first correlation ID;
sending the initial message for the first location session in response to receiving the first location request;
receiving the second location request for the UE from the network entity, the second location request comprising the second correlation ID; and
sending the initial message for the second location session in response to receiving the second location request.

5. The method of claim 1, further comprising:
determining a first session identifier (ID), wherein the indication of the first location session and the end message of the first location session comprise the first session ID, wherein the initial message for the first location session comprises the first session ID; and
determining a second session ID, wherein the second session ID is different from the first session ID, wherein the indication of the second location session comprises the second session ID, wherein the initial message for the second location session comprises the second session ID.

6. The method of claim 1, wherein the indication of the first location session comprises an indication that the first location session is a new location session, wherein the indication of the second location session comprises an indication that the second location session is a new location session.

7. The method of claim 1, wherein the end message of the first location session is an acknowledgment message.

8. The method of claim 1, wherein the location server is an Enhanced Serving Mobile Location Center (E-SMLC) and the network entity is a Mobility Management Entity (MME).

9. The method of claim 1, wherein the location server is a Location Management Function (LMF) and the network entity is an Access and Mobility Management Function (AMF).

10. The method of claim 1, wherein the initial message for the first location session, the end message for the first location session and the initial message for the second location session are each a Long Term Evolution (LTE) Positioning Protocol (LPP) message.

11. A location server for supporting location services for a user equipment (UE), the location server comprising:
an external interface configured to communicate with a wireless network;
memory configured to store instructions; and
at least one processor coupled to the external interface and the memory, the at least one processor configured by the instructions stored in the memory to:
send via the external interface, in response to receiving a first location request for the UE, an initial message for a first location session and an indication of the first location session to a network entity;
send via the external interface, in response to receiving a second location request for the UE, an end message indicating an end of the first location session to the network entity;
after the end message for the first location session is sent, complete the first location session by calculating a location of the UE corresponding to the first location request; and
send via the external interface an initial message for a second location session and an indication of the second location session to the network entity after the end message for the first location session is sent, wherein the second location session is initiated after the first location session ends and the first location session and the second location session are non-concurrent location sessions, wherein at least one of the end message of the first location session and the indication of the second location session indicates that the second location session is different from the first location session, wherein the indication that the second location session is different from the first location session enables the UE to treat the non-concurrent location sessions as different location sessions.

12. The location server of claim 11, wherein the indication of the first location session and the end message of the first location session comprise a first correlation identifier (ID) and the indication of the second location session comprises a second correlation ID, wherein the second correlation ID is different from the first correlation ID.

13. The location server of claim 12, wherein the network entity determines the first correlation ID and the second correlation ID.

14. The location server of claim 13, wherein the at least one processor is further configured to:
receive via the external interface the first location request for the UE from the network entity, the first location request comprising the first correlation ID;
send via the external interface the initial message for the first location session in response to receiving the first location request;
receive via the external interface the second location request for the UE from the network entity, the second location request comprising the second correlation ID; and
send via the external interface the initial message for the second location session in response to receiving the second location request.

15. The location server of claim 11, wherein the at least one processor is further configured to:
determine a first session identifier (ID), wherein the indication of the first location session and the end message of the first location session comprise the first session ID, wherein the initial message for the first location session comprises the first session ID; and
determine a second session ID, wherein the second session ID is different from the first session ID, wherein the indication of the second location session comprises the second session ID, wherein the initial message for the second location session comprises the second session ID.

16. The location server of claim 11, wherein the indication of the first location session comprises an indication that the first location session is a new location session, wherein the indication of the second location session comprises an indication that the second location session is a new location session.

17. The location server of claim 11, wherein the end message of the first location session is an acknowledgment message.

18. The location server of claim 11, wherein the location server is an Enhanced Serving Mobile Location Center (E-SMLC) and the network entity is a Mobility Management Entity (MME).

19. The location server of claim 11, wherein the location server is a Location Management Function (LMF) and the network entity is an Access and Mobility Management Function (AMF).

20. The location server of claim 11, wherein the initial message for the first location session, the end message for the first location session and the initial message for the second location session are each a Long Term Evolution (LTE) Positioning Protocol (LPP) message.

21. A location server for supporting location services for a user equipment (UE), the location server comprising:
means for sending, in response to receiving a first location request for the UE, an initial message for a first location session and an indication of the first location session to a network entity;
means for sending an end message indicating an end of the first location session to the network entity;
means for completing the first location session by calculating a location of the UE corresponding to the first location request, after sending the end message; and
means for sending, in response to receiving a second location request for the UE, an initial message for a second location session and an indication of the second location session to the network entity after the end message for the first location session is sent, wherein the second location session is initiated after the first location session ends and the first location session and the second location session are non-concurrent location sessions, wherein at least one of the end message of the first location session and the indication of the second location session indicates that the second location session is different from the first location session, wherein the indication that the second location session is different from the first location session enables the UE to treat the non-concurrent location sessions as different location sessions.

22. The location server of claim 21, wherein the indication of the first location session and the end message of the first location session comprise a first correlation identifier (ID) and the indication of the second location session comprises a second correlation ID, wherein the second correlation ID is different from the first correlation ID.

23. The location server of claim 22, wherein the network entity determines the first correlation ID and the second correlation ID, the location server further comprising:
means for receiving the first location request for the UE from the network entity, the first location request comprising the first correlation ID;
means for sending the initial message for the first location session in response to receiving the first location request;
means for receiving the second location request for the UE from the network entity, the second location request comprising the second correlation ID; and
means for sending the initial message for the second location session in response to receiving the second location request.

24. The location server of claim 21, further comprising:
means for determining a first session identifier (ID), wherein the indication of the first location session and the end message of the first location session comprise the first session ID, wherein the initial message for the first location session comprises the first session ID; and
means for determining a second session ID, wherein the second session ID is different from the first session ID, wherein the indication of the second location session comprises the second session ID, wherein the initial message for the second location session comprises the second session ID.

25. A non-transitory storage medium including program code stored thereon, the program code is operable to configure at least one processor in a location server for supporting location services for a user equipment (UE), the program code comprising instructions to:
send, in response to receiving a first location request for the UE, an initial message for a first location session and an indication of the first location session to a network entity;
send an end message indicating an end of the first location session to the network entity;
after the end message for the first location session is sent, calculate a location of the UE corresponding to the first location request; and
send, in response to receiving a second location request for the UE, an initial message for a second location session and an indication of the second location session to the network entity after the end message for the first location session is sent, wherein the second location session is initiated after the first location session ends and the first location session and the second location session are non-concurrent location sessions, wherein at least one of the end message of the first location session and the indication of the second location session indicates that the second location session is different from the first location session, wherein the indication that the second location session is different from the first location session enables the UE to treat the non-concurrent location sessions as different location sessions.

26. The non-transitory storage medium of claim 25, wherein the indication of the first location session and the end message of the first location session comprise a first correlation identifier (ID) and the indication of the second location session comprises a second correlation ID, wherein the second correlation ID is different from the first correlation ID.

27. The non-transitory storage medium of claim 26, wherein the network entity determines the first correlation ID and the second correlation ID, the program code further comprising instructions to:
receive the first location request for the UE from the network entity, the first location request comprising the first correlation ID;
send the initial message for the first location session in response to receiving the first location request;
receive the second location request for the UE from the network entity, the second location request comprising the second correlation ID; and
send the initial message for the second location session in response to receiving the second location request.

28. The non-transitory storage medium of claim 25, the program code further comprising instructions to:
determine a first session identifier (ID), wherein the indication of the first location session and the end message of the first location session further comprise the first session ID, wherein the initial message for the first location session comprises the first session ID; and determine a second session ID, wherein the second session ID is different from the first session ID, wherein the indication of the second location session further comprises the second session ID, wherein the initial message for the second location session comprises the second session ID.

\* \* \* \* \*